US009182316B2

(12) United States Patent
Cocconcelli et al.

(10) Patent No.: US 9,182,316 B2
(45) Date of Patent: Nov. 10, 2015

(54) PREDICTIVE ROLLING BEARING MAINTENANCE

(75) Inventors: Marco Cocconcelli, Reggio Emilia (IT); Luca Bassi, Painoro (IT); Davide Borghi, Modena (IT); Riccardo Rubini, Bologna (IT); Cristian Secchi, Quattro Castella (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 731 days.

(21) Appl. No.: 13/201,336

(22) PCT Filed: Mar. 5, 2010

(86) PCT No.: PCT/EP2010/052818
§ 371 (c)(1),
(2), (4) Date: Aug. 12, 2011

(87) PCT Pub. No.: WO2010/100253
PCT Pub. Date: Sep. 10, 2010

(65) Prior Publication Data
US 2011/0301873 A1 Dec. 8, 2011

(30) Foreign Application Priority Data

Mar. 5, 2009 (EP) .................................... 09154474

(51) Int. Cl.
G06F 19/00 (2011.01)
G01M 13/04 (2006.01)
(Continued)

(52) U.S. Cl.
CPC ............ *G01M 13/04* (2013.01); *G01M 13/045* (2013.01); *F16C 19/527* (2013.01); *G01M 13/028* (2013.01)

(58) Field of Classification Search
CPC . G01M 13/04; G01M 13/045; G01M 13/028; F16C 19/527
See application file for complete search history.

(56) References Cited

U.S. PATENT DOCUMENTS 4,912,661 A * 3/1990 Potter .......................... 702/147
5,511,422 A 4/1996 Hernandez
(Continued)

FOREIGN PATENT DOCUMENTS

CN 2543050 Y 4/2003
CN 1724990 A 1/2006
(Continued)

OTHER PUBLICATIONS

Rai et al., "Bearing fault diagnosis using FFT of intrinsic mode functions in Hilbert-Huang transform" Mechanical Systems and Signal Processing 21 (2007) 2607-2615.*
Bai et al. "Fault diagnosis of rotating machinery using an intelligent order tracking system" Journal of Sound and Vibration 280 (2005) 699-718.*

(Continued)

*Primary Examiner* — Andrew Schechter
*Assistant Examiner* — John Kuan
(74) *Attorney, Agent, or Firm* — Buchanan Ingersoll & Rooney P.C.

(57) ABSTRACT

A method of predicting a fault in a rolling bearing, the rolling bearing including inner and outer rings and rolling bodies evenly angularly distributed therebetween, the method comprising: processing (in the DSP system 8) a position signal ($x(t)$) indicative of a relative angular position of the inner ring with respect to the outer rings, and a vibration signal ($y(t)$) (by the accelerometer 7) indicative of speed-related vibrations in the rolling bearing, such that they correspond to either an angular displacement of the rolling bodies equal to an integer number of angular gaps between adjacent rolling bodies or an integer number of complete rotations of the inner ring with respect to the outer ring; space sampling (in the ND acquisition board 9) the processed vibration signal ($y(t)$) based on the processed position signal ($x(t)$); and predicting a fault in the rolling bearing based on the space-sampled vibration signal ($y(t)$).

10 Claims, 16 Drawing Sheets

(51) Int. Cl.
*F16C 19/52* (2006.01)
*G01M 13/02* (2006.01)

(56) References Cited

U.S. PATENT DOCUMENTS

| | | | |
|---|---|---|---|
| 5,811,683 A | | 9/1998 | Yoshioka et al. |
| 6,351,714 B1 * | | 2/2002 | Birchmeier ............... 702/56 |
| 2004/0199348 A1 * | | 10/2004 | Hitchcock et al. ............ 702/92 |
| 2008/0035619 A1 * | | 2/2008 | Hamaguchi et al. ..... 219/121.79 |
| 2008/0317613 A1 * | | 12/2008 | Yokota ....................... 417/410.1 |

FOREIGN PATENT DOCUMENTS

| | | |
|---|---|---|
| CN | 1825082 A | 8/2006 |
| JP | H07-311082 A | 11/1995 |
| JP | 2006-153855 A | 6/2006 |
| RU | 2113699 C1 | 6/1998 |

OTHER PUBLICATIONS

International Search Report (PCT/ISA/210) issued on Apr. 14, 2010, by European Patent Office as the International Searching Authority for International Application No. PCT/EP2010/052818.
Written Opinion (PCT/ISA/237) issued on Apr. 14, 2010, by European Patent Office as the International Searching Authority for International Application No. PCT/EP2010/052818.
Ron Potter, "A New Order Tracking Method for Rotating Machinery", Sound and Vibration, vol. 24, Sep. 1990, pp. 30-34.
K. R. Fyfe et al. "Analysis of Computed Order Tracking", Mechanical System and Signal Processing, 1997 (month unknown), vol. 11, No. 2, pp. 187-205.
Official Action issued by Japanese Patent Office on Nov. 26, 2013 in Japanese Application No. 2011-552462, and English language translation of Official Action (6 pgs).
First Office Action issued on Jun. 14, 2013, by the State Intellectual Property Office, P.R. China in corresponding Chinese Patent Application No. 201080010966.3, and an English Translation of the Office Action. (20 pages).

* cited by examiner

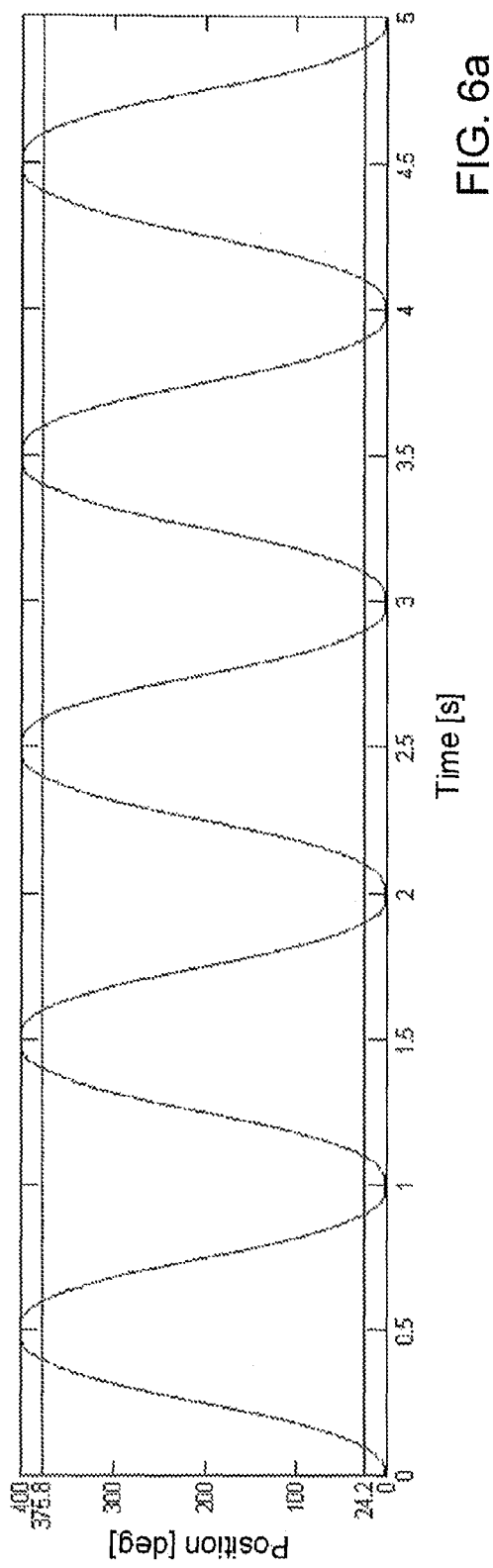
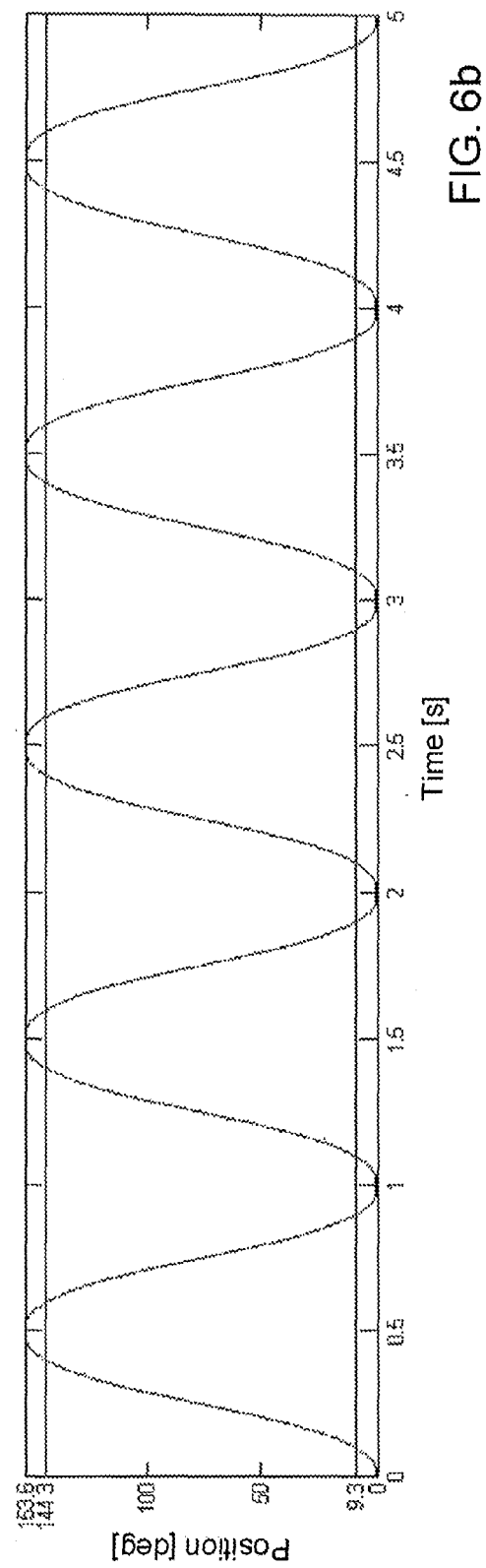
FIG. 6a
FIG. 6b

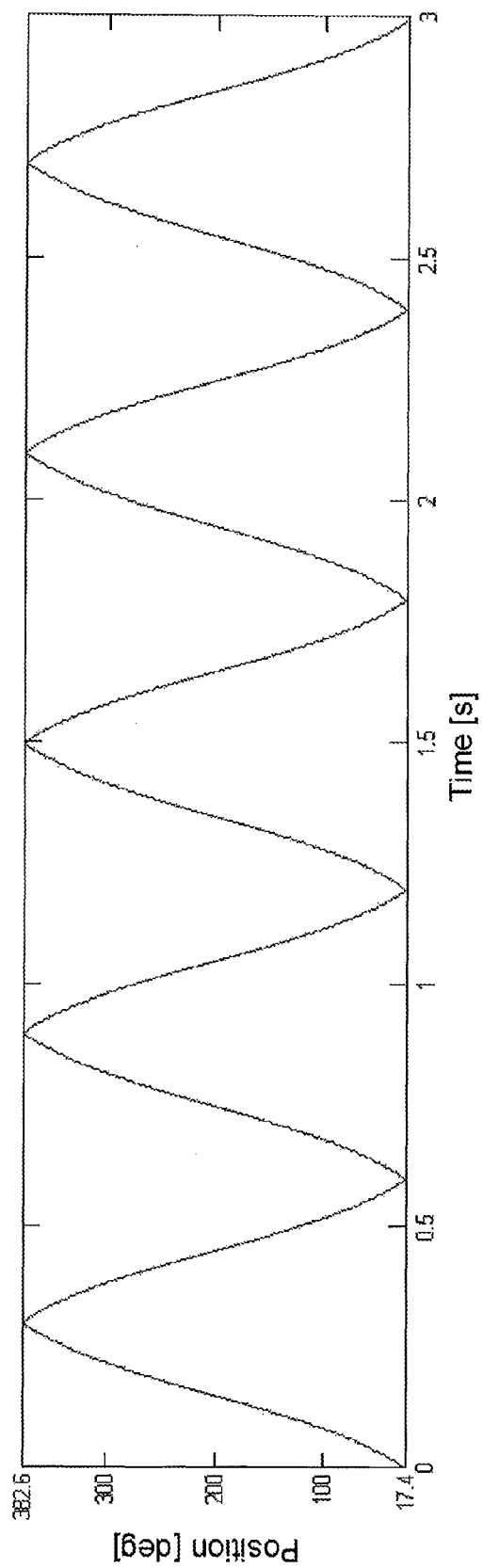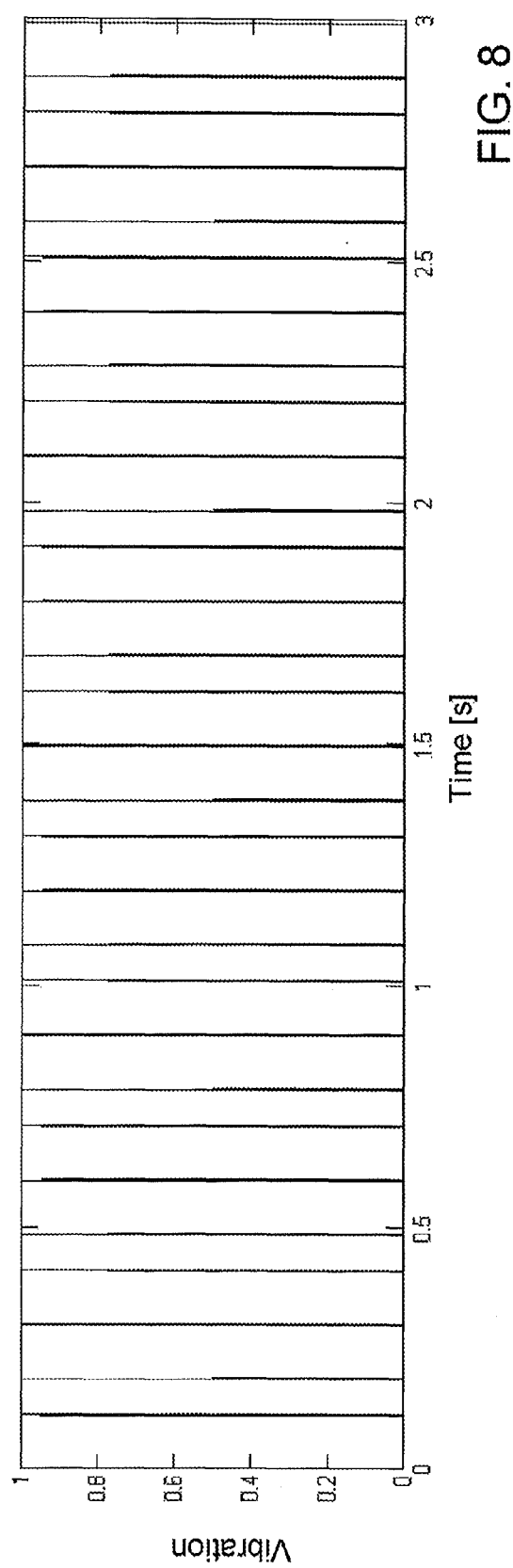
FIG. 8

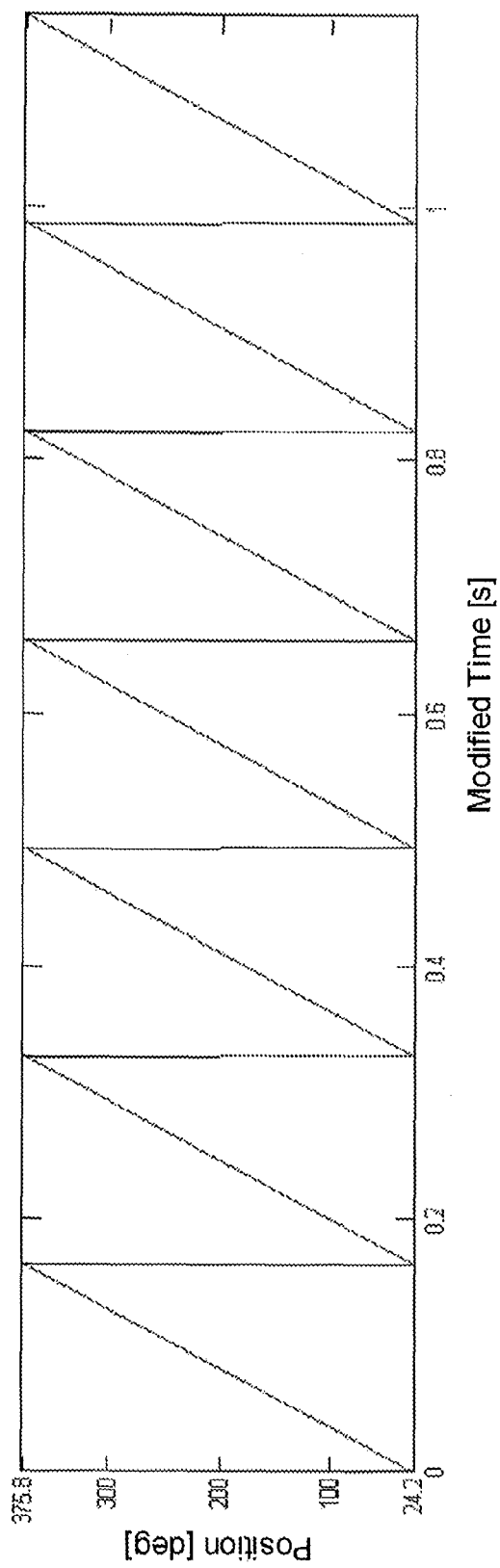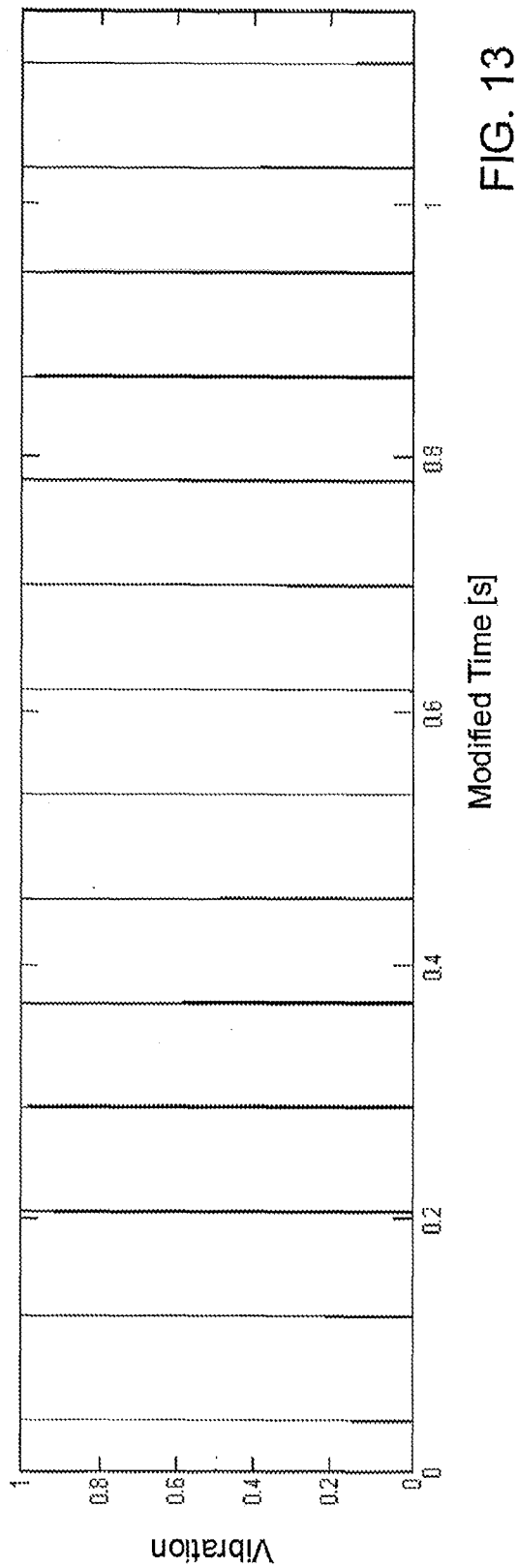
FIG. 13

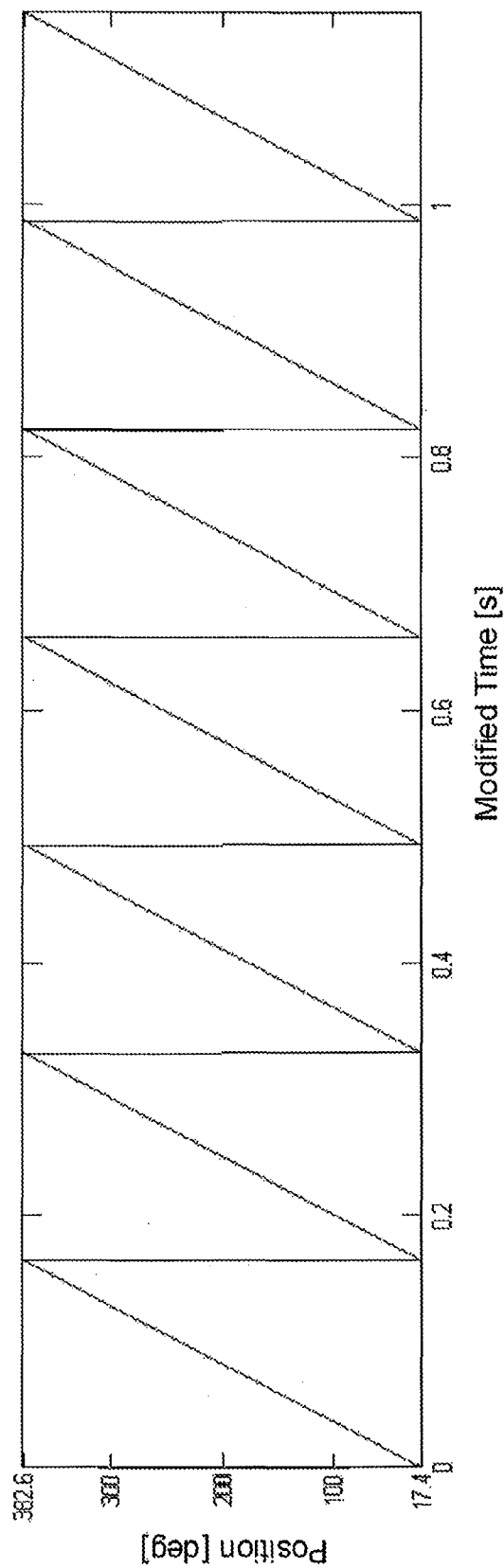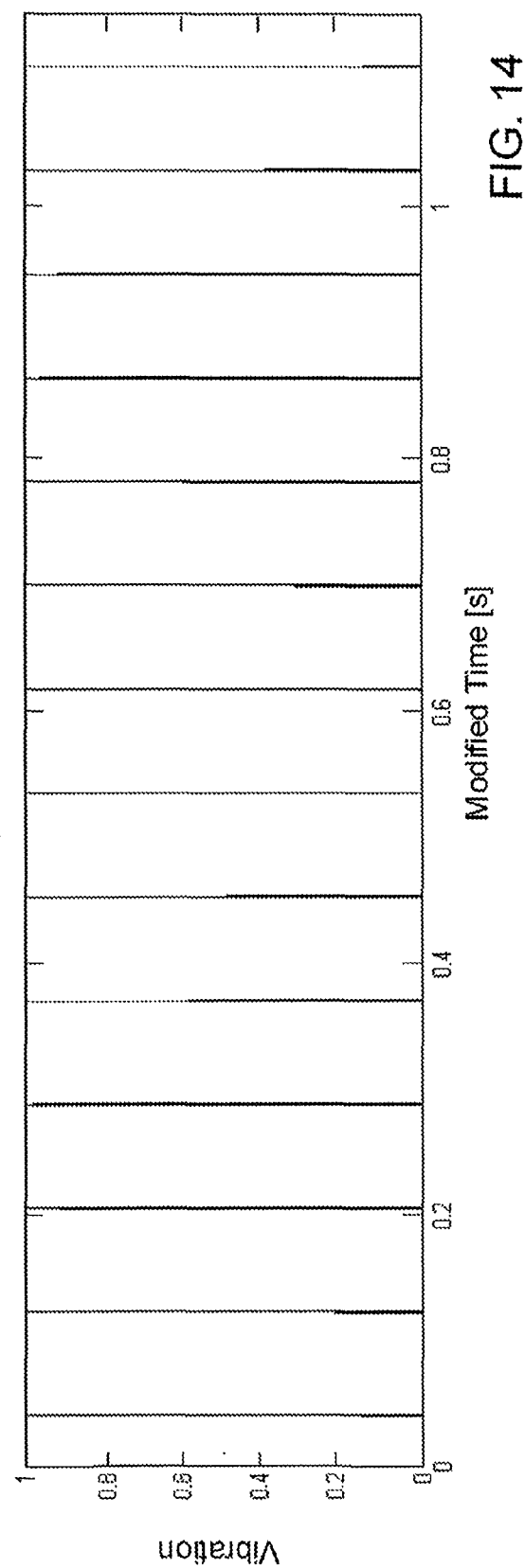
FIG. 14

PREDICTIVE ROLLING BEARING MAINTENANCE

TECHNICAL FIELD OF THE INVENTION

The present invention relates in general to predictive rolling bearing maintenance, and in particular to maintenance-oriented, condition-based monitoring of rolling bearings in servomotors operating at an arbitrarily variable low speed and with (cyclic) motion inversions, such those employed in Filling Machines or Distribution Equipments of Packaging Lines designed to produce sealed packages containing a food product.

BACKGROUND ART

As is known, on a factory floor of a food packaging plant, several specifically-aimed processes are generally performed, including incoming food and packaging material storage, food processing, food packaging, and package warehousing. With specific reference to pourable food products, food packaging is performed in Packaging Lines, each of which is an assembly of machines and equipments for the production and handling of packages, and includes a Filling Machine for the production of sealed packages, followed by one or more defined configurations of downstream Distribution Equipments such as, accumulators, straw applicators, film wrappers, and cardboard packers, connected to the Filling Machine via Conveyors, for the handling of the packages.

A typical example of this type of packages is the parallelepiped-shaped package for liquid or pourable food products known as Tetra Brik Aseptic®, which is made by folding and sealing a laminated web of packaging material.

The packaging material has a multilayer sheet structure substantially comprising one or more stiffening and strengthening base layers typically made of a fibrous material, e.g. paper, or mineral-filled polypropylene material, covered on both sides with a number of heat-seal plastic material layers, e.g. polyethylene film. In the case of aseptic packages for long-storage products, such as UHT milk, the packaging material also comprises a gas- and light-barrier material layer, e.g. aluminium foil or ethyl vinyl alcohol (EVOH) film, which is superimposed on a heat-seal plastic material layer, and is in turn covered with another heat-seal plastic material layer forming the inner face of the package eventually contacting the food product.

Packages of this sort are produced on fully automatic Filling Machines, wherein a continuous vertical tube is formed from the web-fed packaging material; which is sterilized by applying a chemical sterilizing agent such as a hydrogen peroxide solution, which, once sterilization is completed, is removed, e.g. evaporated by heating, from the surfaces of the packaging material; and the sterilized web is maintained in a closed, sterile environment, and is folded and sealed longitudinally to form the vertical tube. The tube is then filled downwards with the sterilized or sterile-processed pourable food product, and is fed along a vertical path to a forming station, where it is gripped along equally spaced cross sections by a jaw system including two or more pairs of jaws, which act cyclically and successively on the tube, and seal the packaging material of tube to form a continuous strip of pillow packs connected to one another by transverse sealing strips. Pillow packs are separated from one another by cutting the relative sealing strips, and are conveyed to a final folding station where they are folded mechanically into the finished, e.g. substantially parallelepiped-shaped, packages.

Alternatively, the packaging material may be cut into blanks, which are formed into packages on forming spindles, and the packages are filled with food product and sealed. One example of this type of package is the so-called "gable-top" package known as Tetra Rex®.

In these Packaging Lines, several components are operated by (electric) servomotors, which, although valuable in several respects, are affected by malfunctions, one of the major causes of which is the breakdown of the rolling bearings supporting the shaft of the servomotors due to fatigue or wear. While fatigue can be statistically characterized in a standard way that leads to the so-called L10 rating of the bearings, wear is a subtler phenomenon, known in the literature as pitting or brinelling, that creates localized damages, the onset of which may (pseudo)randomly appear during the expected lifetime of the component, followed by a relatively quick degradation phase that leads to the complete breakdown. As a result, periodic replacement of these components is a strategy that may be successful only to prevent fatigue-related failures, whereas it will be almost useless against wear-related failures.

Other kinds of preventive periodic maintenance activities, such as cleaning and lubrication, may be effective in reducing bearing wear, as usually wear is characterized by the contamination of the bearing lubricant which in turn worsens the bearing health. Such contamination may come from the exterior (e.g. the bearing is placed in a hostile environment) but may also be due to internal causes (e.g. due to small flakes of material that the revolving elements lose during operation).

Ultimately, however, the only way to prevent wear-related breakdown is condition-based monitoring of the bearing health status; such maintenance strategy is mainly possible thanks to the fact that once the bearing approaches failure, it becomes noisy and vibrates as a warning sign of the impending breakdown: if this sign is detected timely it gives the operator a time frame that typically ranges from days to even weeks (depending on the bearing and the application) to plan a maintenance activity and substitute the bearing without impacting production time.

It may be appreciated that vibration analysis is an important part of industrial predictive maintenance programs so that wear and damages in the rolling bearings can be discovered and repaired before the machine breaks down, thus reducing operating and maintenance costs.

Empirical evaluation of the vibration level of a bearing is an error-prone activity that may lead to significantly underestimate or overestimate the remaining lifetime of the component, and also to mistake for a bearing damage a noise that is due to a completely different cause (e.g. a shaft imbalance). For this reason, the scientific community has striven to provide a scientific characterization of bearing faults, and nowadays a rich literature can be found on this topic.

The basic idea is associating each failure mode of a bearing with a characteristic frequency signature, that can be extracted from a vibration signal via an appropriate analysis. In particular, traditional vibration analysis is based on the fact that if there is a localized damage on one of the bearing surfaces, it will cause a series of impacts during bearing rotation; moreover, such impacts are periodic assuming that the servomotor is rotating at constant speed. In fact, a kinematic analysis of the bearing shows that, assuming that no slip is present, the component is quite similar to an epicyclic gear; in other words there is a fixed "transmission ratio" between the servomotor shaft and all the other moving parts of the bearing, and this leads to the fundamental equation of vibration analysis:

$$f_d = k_d f_r \tag{1}$$

which shows that $f_d$, the damage frequency (which is actually the frequency of such impacts) depends linearly on the rotation frequency $f_r$ by means of a damage coefficient $k_d$ which is none other than the transmission ratio between the servomotor shaft and the moving part on which the damage is located. Such coefficients are well-known in the literature and are given by:

$$k_d = \begin{cases} \frac{1}{2}\left(1 - \frac{B_d}{P_d}\cos\theta\right) = k_g & \text{for cage faults} \\ \frac{1}{2}N\left(1 - \frac{B_d}{P_d}\cos\theta\right) = k_e & \text{for outer ring faults} \\ \frac{1}{2}N\left(1 + \frac{B_d}{P_d}\cos\theta\right) = k_i & \text{for inner ring faults} \\ \frac{1}{2}\frac{B_d}{P_d}N\left[1 - \left(\frac{B_d}{P_d}\cos\theta\right)^2\right] = k_v & \text{for ball faults} \end{cases} \tag{2}$$

where $B_d$, $P_d$ are ball and pitch diameter, N is the number of revolving elements, θ is an angle that indicates a possible misalignment between inner and outer rings (or rings) as a result of mounting operations (typical values are between 0 and 10 degrees), and wherein the subscript d relates in general to damage frequencies, while subscripts g, e, i and v relate to specific kinds of damage, namely in the inner and outer rings, in the balls evenly angularly spaced apart between the inner and outer rings, and in the cage which retains the balls and which rotates jointly, i.e., at the same speed, with the balls.

The repercussions of this phenomenon on the spectrum of a vibration signal can be easily understood using the basic properties of Fourier transforms: if a single impact is considered, in the time domain this can be represented as a forcing action d(t) of impulsive nature and finite duration T, which tends to an ideal Dirac impulse function δ(t) as T→0; likewise, the spectrum D(f) of said signal will be characterized by a bandwidth that will tend to infinity as d(t) approaches the ideal impulse case (whose Fourier transform is constant over all frequencies).

During the actual component operation the forcing action u(t) will be a periodic repetition at the damage frequency of the original impulse d(t):

$$u(t) = \sum_{j=-\infty}^{\infty} d(t - jT_d) \tag{3}$$

By virtue of the properties of the Fourier transform, periodic repetition in time equates to sampling in frequency, which means that the spectrum U(f) of the forcing action that a localized damage applies to the bearing is a discrete spectrum, obtained by sampling the original impulse spectrum D(f):

$$U(f) = \sum_{j=-\infty}^{\infty} D(f)\delta(f - jf_d) \tag{4}$$

In practice, this means that the frequency signature of the damage in the vibration signal is a sequence of peaks separated by the characteristic damage frequency of the bearing part damaged.

In general, however, the spectrum of a vibration signal acquired on a bearing does not reproduce exactly U(f); it can be rather represented as:

$$Y(f) = G(f)H(f)U(f) + N(f) \tag{5}$$

where G(f) is the transfer function of the mechanical assembly, H(f) is the sensor (usually an accelerometer) sensitivity function, and N(f) is any kind of noise superimposed to the fault signal. The spectrum of Y(f) as such may not therefore be the best signal to look at in order to identify a damage signature; the usual procedure to obtain a signal with better signal-to-noise ratio is called envelope analysis and is based on the following assumptions: there exist a frequency band [f1, f2] such that:

|G(f)|>>1, that is we are near a mechanical resonance

|H(f)|>>1, that is we are in the operational range of the sensor

|N(f)|<<1, which means in practice that we have to look for higher harmonics of the signal U(f).

The latter statement is motivated by the fact that usually mechanical noise is higher at low frequencies. There are some exceptions to this rule, for example noise due to gearing attached to the motor, and in this case it is necessary to resort to more advanced known filtering techniques. If the above hypotheses are satisfied, by band-pass filtering in the frequency band [f1, f2] and demodulation of Y(f) it is possible to obtain a signal where some peaks are clearly visible, spaced by $f_d$.

Summing up, classical vibration analysis is based upon the following hypotheses:

there is a localized damage on a bearing;

the motor the bearing is attached to rotates at a constant speed;

there is no slip during the relative motion of the bearing elements;

during the motor operation, the damage causes a series of short-duration impacts, that generate a train of spikes in the frequency spectrum of the vibration signal with a certain periodicity; and there is a frequency band where the signal-to-noise ratio is such that the train of impulses is detectable.

If these conditions are not verified, the train of peaks may be smeared so that it is not recognizable anymore, or can be hidden among other kinds of noise. Moreover, the fact that the angle θ in (2) is almost impossible to measure under practical circumstances adds some difficulties to the task, as each $f_d$ is actually variable in the range of admissible θ's. Most research in the field has historically been focused to signal processing techniques to obtain better signal-to-noise ratios or to cope with smearing of the peaks due to small fluctuations of velocity or the presence of slip.

Despite the basic assumption of constant rotation speed of the servomotors still holds true for many applications, it proves to be a huge limitation in the field of automatic machines, where usually a number of servomotors are employed as electric cams and operated at a variable speed in order to obtain variable speed profiles of the actuated elements. In particular, as servomotors, usually AC brushless motors, tend to appear more and more often in recent machine designs thanks to their performance being much higher than the mechanical solutions for machine motion in time required to reconfigure the motion profile, in these applications any rolling bearing fault prediction based on frequency signature determined via the above-described classical vibration analysis proves to be unsatisfactory.

In order to extend the above-described classical vibration analysis based on the constant rotation speed assumption to cope with applications in which the rotation speed of the servomotors varies over time, a so-called Order Tracking (OT) vibration analysis has been proposed, which is a frequency analysis that uses multiples, commonly referred to as orders, of the rotation speed, instead of absolute frequencies (Hz) as the frequency base, and is useful for machine condition monitoring because it can easily identify speed-related vibrations such as shaft defects and bearing wear. For a detailed discussion of this technique, reference may be made to R. Potter, *A new order tracking method for rotating machinery*, Sound and Vibration 24, 1990, 30-34, and K. Fyfe, E. Munck, *Analysis of computed order tracking*, Mechanical System and Signal Processing 11(2), 1997, 187-205.

Order Tracking is based on a constant spatial sampling approach, according to which the vibration signal is sampled at constant angular increments (i.e. uniform $\Delta\theta$), and hence at a frequency proportional to the bearing rotation speed. Traditional order tracking accomplishes this task by using a variable-time data acquisition system, wherein a time-sampling is performed at a frequency which is varied proportionally to the bearing rotation speed. Computed order tracking (COT), instead, accomplishes this task by using a constant-time data acquisition system, wherein the vibration signal is first time-sampled at a constant frequency (i.e. constant-time sampling with uniform $\Delta t$), and then the sampled data are digitally spatially re-sampled at constant angular increments (i.e. constant-space sampling with uniform $\Delta\theta$) to provide the desired constant $\Delta\theta$ data. Therefore, Order Tracking maps real time reference t to a modified time reference $\tau$ such that the vibration signal is seen as if it were generated piece-wise by a bearing rotating at a constant speed. This mapping results in a modified vibration signal where the frequency signature of a given typology of damage can be found, and in a rolling bearing fault being satisfactorily predicted.

OBJECT AND SUMMARY OF THE INVENTION

The Applicant has experienced that, despite its unquestionable value, Computed Order Tracking is still based on further assumptions about the servomotor operation, such as operation at a high rotation speed (>500 rpm), several shaft revolutions needed for the fault detection, no motion inversions, which prevent its teaching from being satisfactorily applicable to servomotors which operate at arbitrarily variable low rotation speed, are subjected to cyclic motion inversions, and perform about one shaft revolution per cycle, such as those employed in the food product packaging field to operate the jaw systems.

The objective of present invention is hence to provide a technique which allows the Computed Order Tracking to be applied also to servomotors which operate at arbitrarily variable low rotation speed, are subjected to cyclic motion inversions, and perform about one shaft revolution per cycle, such as those employed in the food product packaging field, to satisfactorily predict servomotor rolling bearing faults, so allowing the current machine maintenance programs to be effectively enhanced.

This objective is achieved by the present invention in that it relates to a method of predicting faults in a rolling bearing, to a digital signal processing system programmed to implement the method, and to a software product designed to implement, when executed, the method, as defined in the appended claims.

BRIEF DESCRIPTION OF THE DRAWINGS

For a better understanding of the present invention, preferred embodiments, which are intended purely by way of example and are not to be construed as limiting, will now be described with reference to the attached drawings (all not to scale), wherein:

FIG. 3 schematically shows a cross-section of an 8-ball bearing;

FIGS. 6a and 6b show relative positions of an inner ring and, respectively, of a balls-cage assembly with respect to an outer ring of a rolling bearing plotted versus time;

FIGS. 7 and 8 show a "cut & paste" operation according to a first embodiment of the present invention, to be performed on an acquired position signal x(t) and a filtered vibration signal $y_f(t)$ to test a rolling bearing for a fault in the inner ring;

FIGS. 13, 14 and 15 show processed space-sampled position and vibration signals obtained by reversing portions of the space-sampled position and vibration signals $\tilde{x}(t)$ and $\tilde{y}(t)$ corresponding to the falling ramps of the space-sampled position signals $\tilde{x}(t)$ shown in FIGS. 5, 7 and 11, respectively.

DETAILED DESCRIPTION OF PREFERRED EMBODIMENTS OF THE INVENTION

The following description is presented to enable a person skilled in the art to make and use the invention. Various modifications to the embodiments will be readily apparent to those skilled in the art, without departing from the scope of the claimed invention. Thus, the present invention is not intended to be limited to the embodiments shown, but is to be accorded the widest scope consistent with the principles and features disclosed herein and defined in the appended claims.

The basic idea underlying the present invention is to appropriately modify the traditional Computed Order Tracking to take into account the specific motion profile, namely cyclic motion inversions and about one shaft revolution per cycle, of the servomotors employed in the food product Packaging Lines, so as to provide what hereinafter will be called Modified Computed Order Tracking (MCOT).

Figure 1:
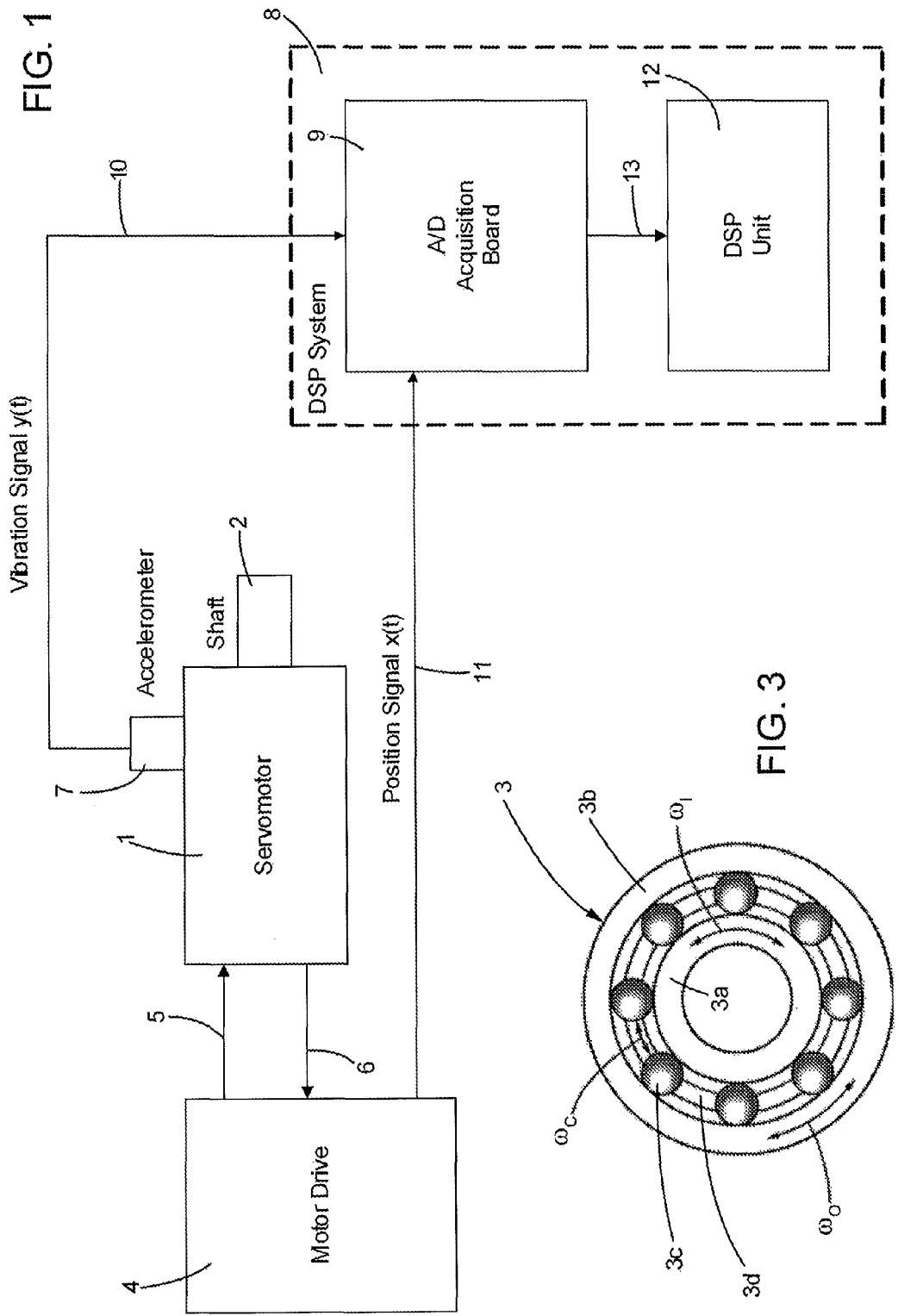
FIG. 1 shows a general block diagram of a data acquisition system configured to implement a Modified Computed Order Tracking according to the present invention.

FIG. 1 shows a general block diagram of a data acquisition system configured to implement the MCOT according to the present invention. In particular, in FIG. 1, reference numeral 1 designates a servomotor with a shaft 2 rotatably supported by a rolling bearing 3 (FIG. 3) comprising an inner ring 3a, and outer ring 3b, and rolling bodies 3c retained and evenly angularly distributed between the inner and outer rings 3a, 3b by a cage 3d, and whose faults are to be predicted via the MCOT, and which may be operated either cyclically in one and the same direction, namely without any rotation inversion, or to cyclically reverse its rotation direction; reference numeral 4 designates the servomotor drive, which supplies the servomotor 1 with electric power via a power cable 5, receives from the servomotor 1, via a feedback cable 6, a feedback signal generated by a high-resolution encoder (not shown) associated with the servomotor shaft 2, and outputs a position signal x(t) which is generated based on the feedback signal from the servomotor 1 and is indicative of the angular position of the servomotor shaft 2, and hence of the inner ring 3a with respect to the outer ring 3b of the rolling bearing 3; reference numeral 7 designates an accelerometer, which is associated with the monitored rolling bearing 3 and outputs a vibration signal y(t) which is indicative of the intensity of the vibrations in the rolling bearing 3; and reference numeral 8 designates a digital signal processing system configured to implement the MCOT according to the present invention. In particular, the digital signal processing system 8 includes an A/D acquisition board 9, which receives the vibration signal y(t) from the accelerometer 7 via a connection cable 10 and the position signal x(t) from the servomotor drive 4 via a connection cable 11, and which is configured to simultaneously constant-time sample the position and vibration signals x(t) and y(t), so that at each sampling time t a couple of values x, y $\in \mathcal{R}^{ns}$ are generated, such that x=[x($t_1$), ..., x($t_{ns}$)] and y=[y($t_1$), ..., y($t_{ns}$)] are synchronized with each other; and a digital signal processing (DSP) unit 12, which is connected to the A/D acquisition board 9 via a connection cable 13 to receive the time-sampled position and vibration signals, still designated by x(t) and y(t), and is programmed to process these signals according to the MCOT of the present invention, which will be hereafter described with reference to the general flowchart shown in FIG. 2.

Figure 2:
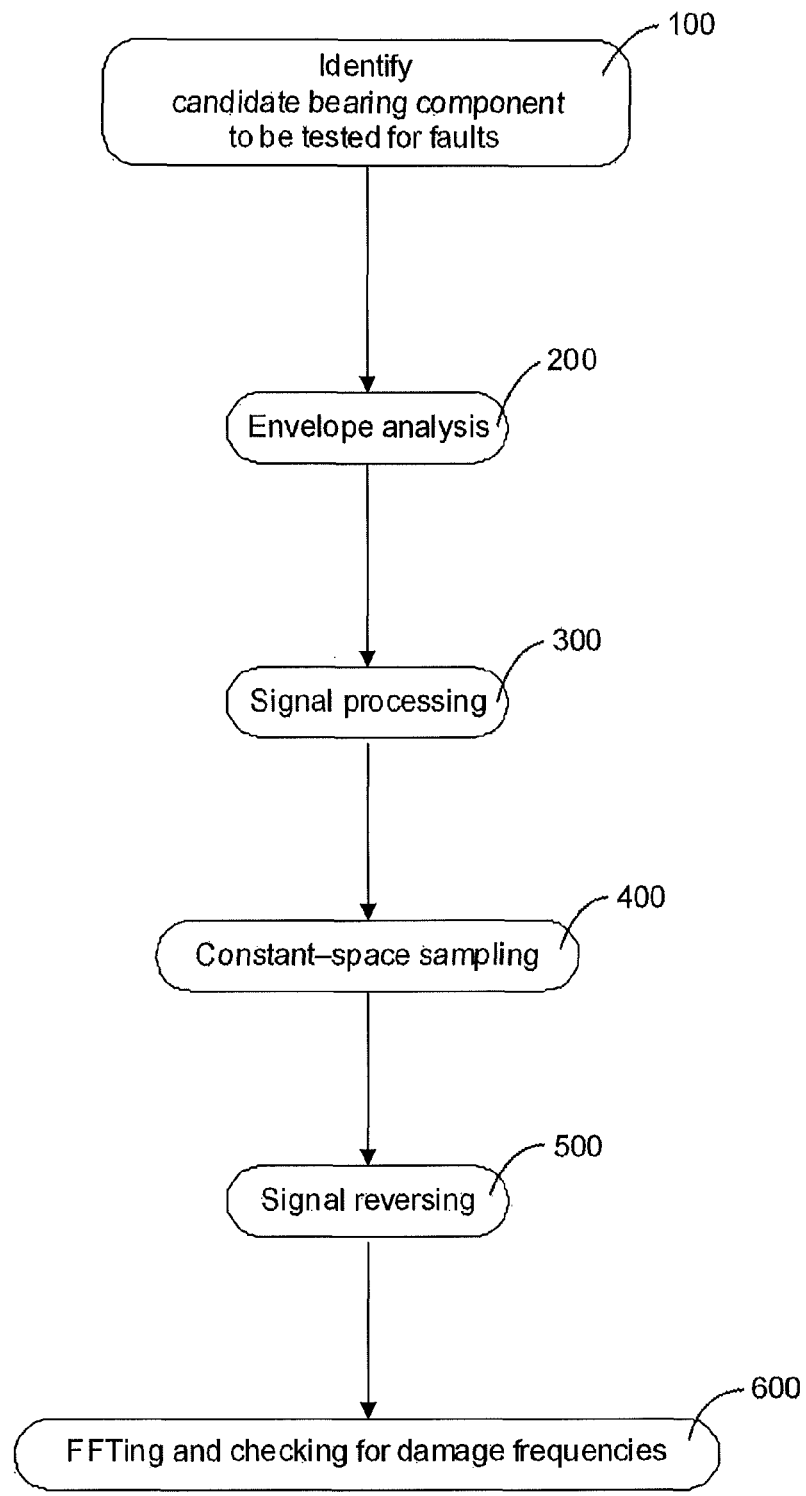
FIG. 2 shows a general flowchart of the Modified Computed Order Tracking according to the present invention.

As shown in FIG. 2, the first step of the MCOT (block 100) is identifying a candidate bearing component to be tested for faults (e.g., inner ring fault, outer ring fault, etc.). In particular, the candidate bearing component to be tested for faults is indicated by an operator via a Graphical User Interface (GUI) implemented by the digital signal processing system 8, and is necessary because testing different bearing components for faults requires separate executions of the MCOT, as the reader will appreciate afterwards when the third step of the MCOT is described.

The second step of the MCOT (block 200) is identifying a suitable frequency band [$f_1$, $f_2$] where the envelope analysis on the time-sampled vibration signal y(t) is performed: this means identifying a resonance frequency in the assembly wherein the servomotor is placed, and it can be done either by simulation or measurement. Such information is application-specific and therefore not likely to change by replacing the servomotor or even by moving to another machine of the same model. Once the suitable frequency band has been identified, the time-sampled position signal x(t) and the time-sampled vibration signal y(t) are acquired over a given acquisition time period, for example of 50 s, and then the time-sampled vibration signal y(t) is band-pass filtered in [$f_1$, $f_2$] and demodulated, so obtaining what hereinafter will be referred to as filtered vibration signal $y_f(t)$.

Filtering and demodulation of the time-sampled vibration signal y(t) is carried out because the filtered vibration signal $y_f(t)$ has a bandwidth equal to $f_2-f_1$, which is generally much lower than the one of the time-sampled vibration signal y(t), and this may improve significantly the readability of the results, especially in highly noisy environments.

The third step of the MCOT (block 300) is processing the time-sampled position signal x(t) and the filtered time-sampled vibration signal $y_f(t)$ according to two different, alternative embodiments of the present invention.

In the first embodiment of the present invention, a particular signal processing is performed which stems from an in-depth analysis of what happens in a faulted bearing during an operating cycle thereof. Let's consider for example a servomotor application wherein the servomotor cyclically reverses its motion every 400°, namely wherein the servomotor has an operating cycle during which the servomotor shaft performs an angular displacement in one direction wider than one complete rotation (a round angle, i.e. 360°), after that it inverts its rotation direction. Let's also consider the case that the rolling bearing is of an 8-ball type shown in FIG. 3, wherein each pair of adjacent balls are spaced apart of an angular gap of 45°. In FIG. 3, the absolute rotation speeds of the inner and outer rings and of the cage are designate by $\omega_I$, $\omega_O$ and $\omega_C$, respectively, and the relative rotation speeds of the inner and outer rings with respect to the intermediate balls-cage assembly, are designate by $\omega_{I-C}$ and $\omega_{O-C}$, respectively.

In the servomotor application considered, where the rolling bearing is of an 8-ball type supports the servomotor shaft, and hence the rotation speed of the inner ring is equal to the rotation speed of the servomotor and the outer ring is stationary ($\omega_O=0$), $\omega_{I-C}=\omega_I-\omega_C=\omega_I-J\omega_I=(1-J)\omega_I=0.616\omega_I$, where J=0.384 is the transmission ratio between the rotation speeds of the inner ring and the balls-cage assembly in a 8-ball bearing, and $\omega_{O-C}=\omega_C-\omega_O=\omega_C$.

Moreover, the relative angular displacement of the balls-cage assembly with respect to the inner ring is $R_{I-C}=\omega_{I-C}T=(1-J)\omega_I T=0.616\cdot 400°=246.4°$, where T is the time duration of an operating cycle of the servomotor and hence $\omega_I T$ is the angular displacement of the inner ring during the operating cycle of the servomotor, and the relative angular displacement of the balls-cage assembly with respect to the outer ring is $R_{O-C}=\omega_{O-C}T=\omega_C T=J\omega_I T=0.384\cdot 400°=153.6°$.

In view of the foregoing, it may be appreciated that if a fault is present in either the inner or the outer ring, a certain number of impacts will occur between the balls and the faulted ring, and this number clearly depends on where the fault is (inner or outer ring) and on the angular gap between the balls. In particular, if the fault is in the inner ring, the number of impacts is equal to int($R_{I-C}$/45)=int(246.4/45)=int(5.475)=5, while if the fault is in the outer ring, the number of impacts is equal to int($R_{O-C}$/45)=int(153.6/45)=int(3.413)=3.

In view of that, it may be appreciated that the fact that in general $R_{I-C}$/45 and $R_{O-C}$/45 are not integers results in the operating cycles of the servomotor generally not ending with an impact, namely in the servomotor performing, after the last impact (third or fifth in the example considered above), an additional angular displacement before reversing the rotation direction.

The Applicant has experienced that this phenomenon adversely affects the acquired vibration signal y(t) to such an extent that the above-described vibration analysis, and in particular the Computed Order Tracking, proves to be unsatisfactory.

Therefore, the signal processing according to the first embodiment of the present invention is aimed at causing the time-sampled position signal x(t) and the filtered vibration signal $y_f(t)$ to look like as if they were generated by an inner ring that continuously rotates in one and the same direction, namely without any inversion of the rotation direction, with respect to the outer ring, and during which the balls-cage assembly performs angular displacements with respect to the inner and outer rings, respectively, each equal to an integer multiple of the angular displacement between two consecutive impacts in the rolling bearing.

This aim is achieved by processing the time-sampled position signal x(t) and the filtered vibration signal $y_f(t)$ such that, in each operating cycle of the servomotor, they correspond to angular displacements of the balls-cage assembly with respect to the inner ring and, respectively, to the outer ring, each of which is equal to a multiple integer of the angular gap between two adjacent rolling elements of the bearing.

The aforementioned signal processing is accomplished by "cutting & pasting" the time-sampled position signal x(t) and the filtered vibration signal $y_f(t)$ to remove (cut away) those portions thereof which allow the aforementioned result to be achieved.

Figure 4:
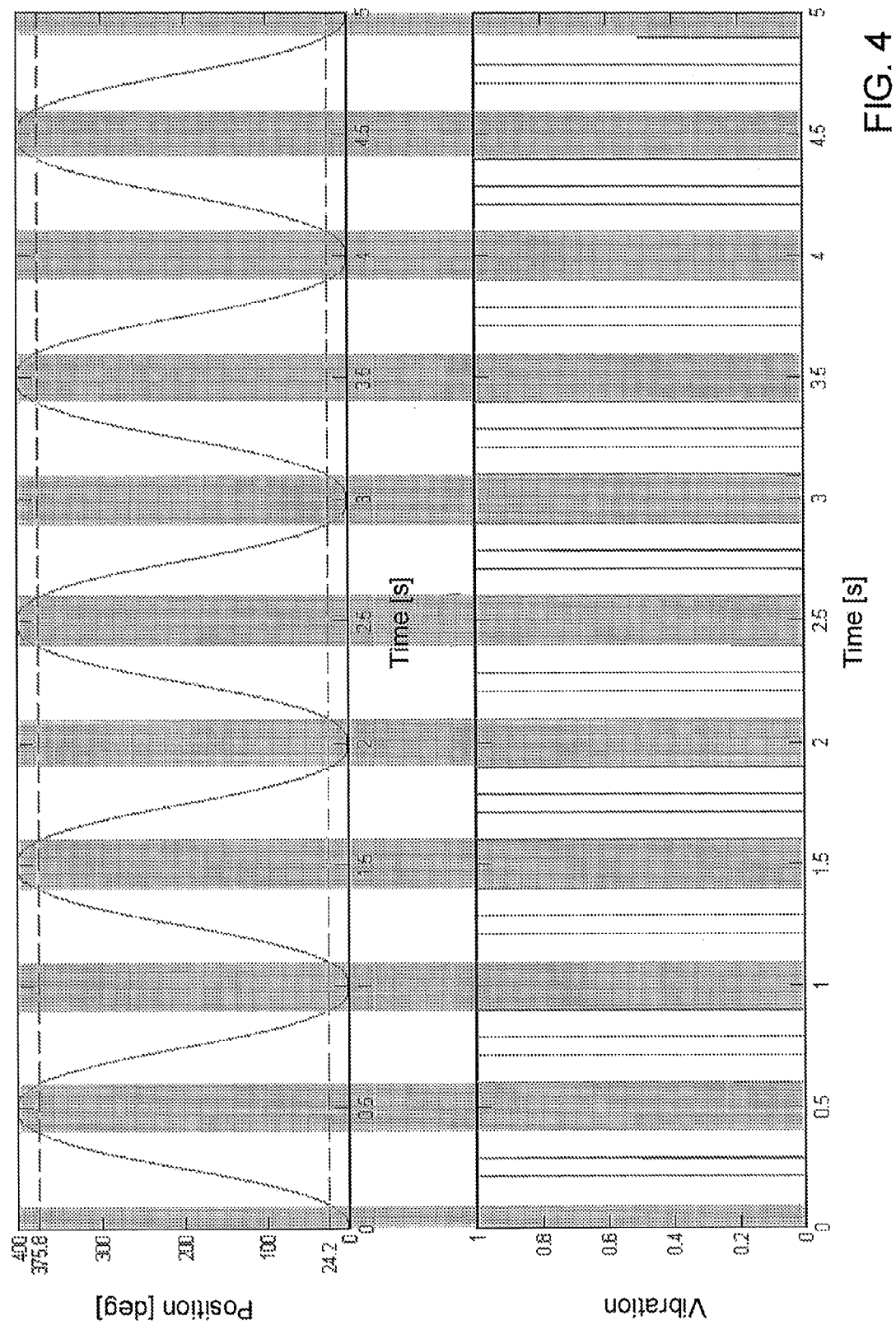
FIGS. 4 and 5 show a "cut & paste" operation according to a first embodiment of the present invention, to be performed on an acquired position signal x(t) and a filtered vibration signal $y_f(t)$ to test a rolling bearing for a fault in the outer ring.
Figure 5:
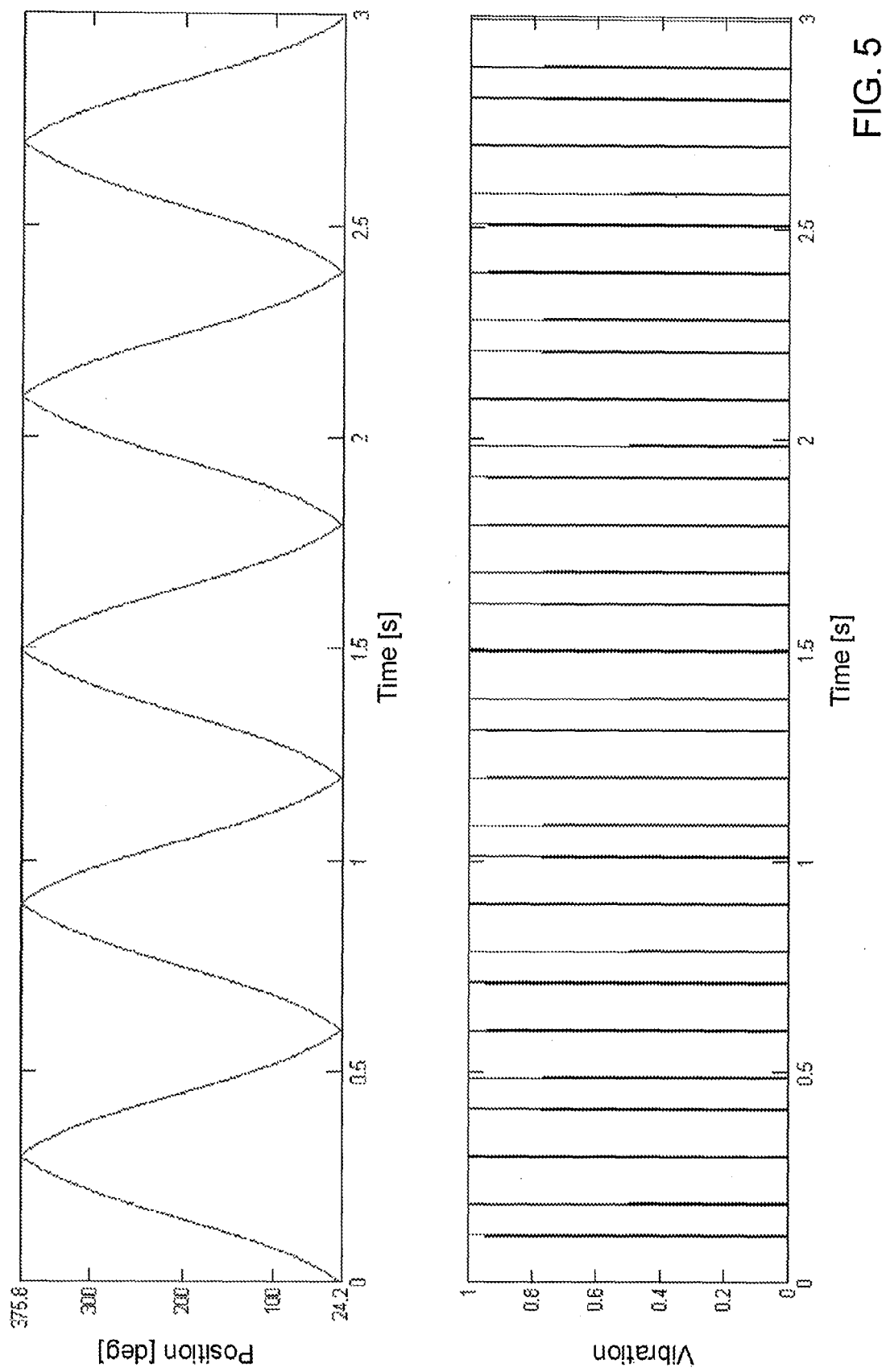
Figure 7:
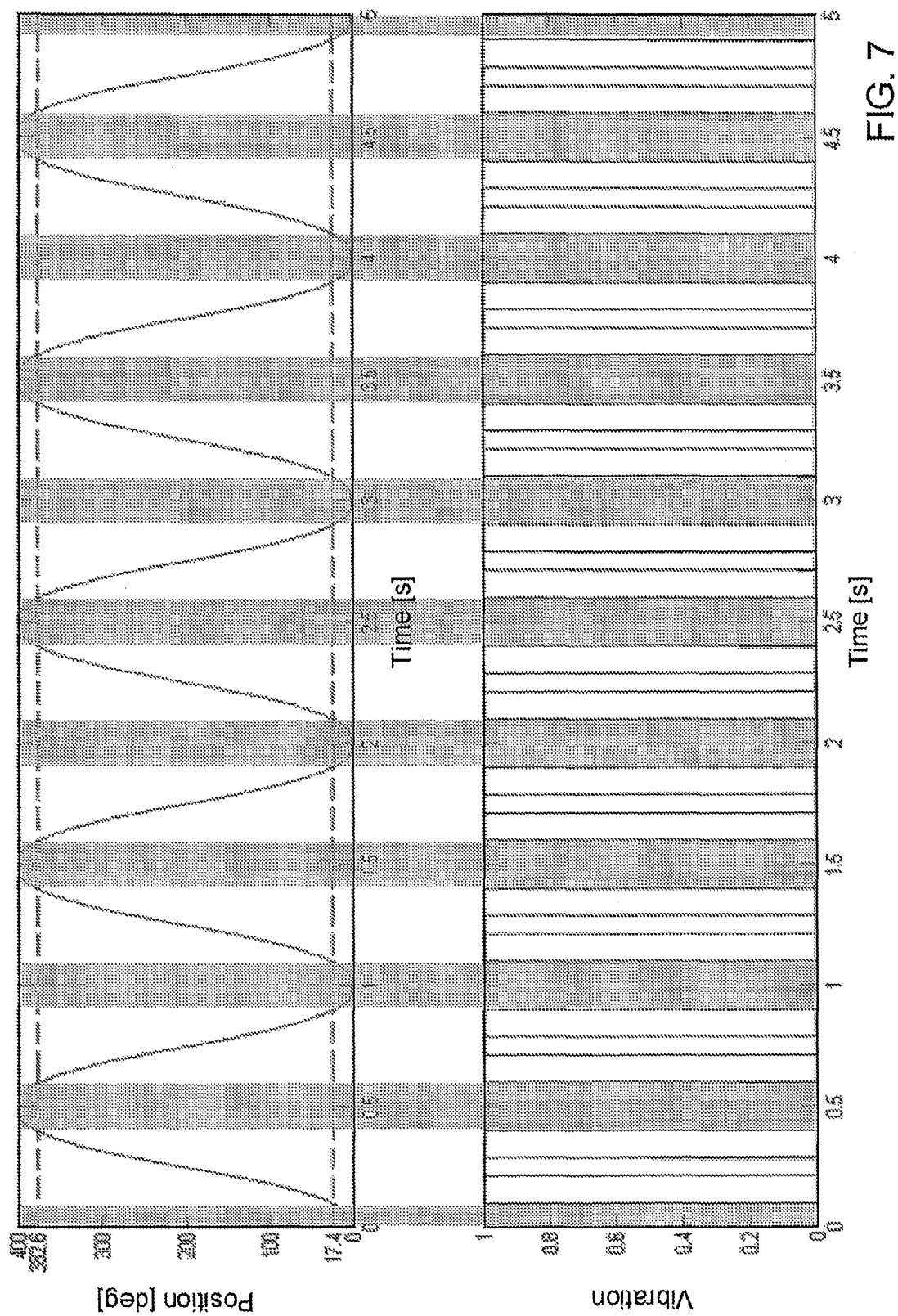

This operation is shown in FIGS. 4 to 6, and in FIGS. 7 to 9, wherein the former three relate to a search for a fault in the outer ring, while the last three relate to a search for a fault in the inner ring. In particular, FIGS. 4 and 7 show the time-sampled position signals x(t), the filtered vibration signals $y_f(t)$ and those parts thereof, bounded by gray-colored rectangles, to be cut away therefrom, while FIGS. 5 and 8 show the processed position and vibration signals $\hat{x}(t)$ and $\hat{y}(t)$, which are obtained by pasting one after the other (merging together) the remaining portions of the corresponding time-sampled position signal x(t) and the filtered vibration signal $y_f(t)$.

In particular, FIG. 4 relates to a search for a fault in the outer ring, whose relative angular displacement with respect to the balls-cage assembly is 153.6°, during which three impacts between the faults and the balls occur. Therefore, in order for the balls-cage assembly to performs an angular displacement equal to an integer multiple of the angular displacement between two consecutive impacts in the outer ring, such an angular displacement should be 3·45°=135° (integer multiple of the angular gap between two adjacent balls of the bearing), which in turn corresponds to an angular displacement of the inner ring of 135°/0.384=351.6°. Therefore, in order for the time-sampled position signal x(t) to correspond to an angular displacement of the inner ring of 351.6°, portions of the time-sampled position signal x(t) and of the filtered vibration signal $y_f(t)$ corresponding to an angular displacement of 400°−351.6°=48.4° of the inner ring are to be cut away.

In order for the retained portions of the time-sampled position signal x(t) and of the filtered vibration signal $y_f(t)$ to be centered in the respective operating cycles of the servomotor, so as to avoid those portions where the servomotor shaft reverses its rotation direction and hence is during a transient rotation state, the portions of the time-sampled position signal x(t) and of the filtered vibration signal $y_f(t)$ that are to be cut away therefrom are those corresponding to both the initial and final portions of the operating cycles of the servomotor, in equal parts, in the example shown in FIG. 4 those portions in the ranges 0° to 24.2° and 375.8° to 400°, so retaining those portions in the ranges 24.2° to 375.8°.

The skilled person may appreciate that other portions of the time-sampled position signal x(t) and of the filtered vibration signal $y_f(t)$ than those shown in FIG. 4 may be cut away therefrom, which allow the same result to be achieved. For example, there may be cut away those portions of the time-sampled position signal x(t) and of the filtered vibration signal $y_f(t)$ corresponding to either the initial or final portions of the original operating cycles, namely in the ranges 0° to 48.4° or 351.6° to 400°, respectively.

The same computation may be made in the domain of the angular displacement of the balls-cage assembly instead of in the domain of the servomotor shaft. In particular, in order for the time-sampled position signal x(t) to correspond to an angular displacement of the bearing cage of 135° and for the retained portions of the time-sampled position signal x(t) to be centered in the operating cycles, those portions in the ranges 0° to 9.3° and from 144.3° to 153.6° (which, in the domain of the servomotor shaft, correspond to the previously indicated ranges 0° to 24.2° and 375.8° to 400°) are to be cut away, and those portions in the ranges 9.3° to 144.3° (which, in the domain of the servomotor shaft, correspond to the previously indicated ranges 24.2° to 375.8°) are to be retained.

The aforementioned ranges are depicted in FIGS. 6a and 6b, where the positions of both the inner ring (FIG. 6a) and the balls-cage assembly (FIG. 6b) with respect to the outer ring are plotted versus time.

FIG. 7 relates instead to a search for a fault in the inner ring, whose relative angular displacement with respect to the balls-cage assembly is 246.4°, and wherein five impacts between the faults and the balls occur. Therefore, in order for the balls-cage assembly to performs an angular displacement equal to an integer multiple of the angular displacement between two consecutive impacts in the inner ring, such an angular displacement should be 5·45°=225° (integer multiple of the angular gap between two adjacent balls of the bearing), which in turn corresponds to an angular displacement of the inner ring of 225°/0.0616=365.2° Therefore, in order for the time-sampled position signal x(t) to correspond to an angular displacement of the inner ring of 365.2°, portions of the time-sampled position signal x(t) and of the filtered vibration signal $y_f(t)$ corresponding to an angular displacement of 400°−365.2°=34.8° of the inner ring are to be cut away.

In order for the retained portions of the time-sampled position signal x(t) and of the filtered vibration signal $y_f(t)$ to be centered in the respective operating cycles of the servomotor, so as to avoid those portions where the servomotor shaft reverses its rotation direction and hence is during a transient rotation state, the portions of the time-sampled position signal x(t) and of the filtered vibration signal $y_f(t)$ that are to be cut away therefrom are those corresponding to both the initial and final portions of the operating cycles of the servomotor, in equal parts, in the example shown in FIG. 7 those portions in the ranges 0° to 17.4° and 382.6° to 400°, so retaining those portions in the ranges 17.4° to 382.6°.

The skilled person may appreciate that other portions of the time-sampled position signal x(t) and of the filtered vibration signal $y_f(t)$ than those shown in FIG. 7 may be cut away therefrom, which allow the same result to be achieved. For example, there may be cut away those portions of the time-sampled position signal x(t) and of the filtered vibration signal $y_f(t)$ corresponding to either the initial or final portions of the original operating cycles, namely in the ranges 0° to 34.8° or 365.2° to 400°, respectively.

The same computation may be made in the domain of the angular displacement of the balls-cage assembly instead of in the domain of the servomotor shaft. In particular, in order for the time-sampled position signal x(t) to correspond to an angular displacement of the bearing cage of 225° and for the retained portions of the time-sampled position signal x(t) to be centered in the operating cycles, those portions in the ranges 0° to 10.7° and from 235.7° to 246.4° (which, in the domain of the servomotor shaft, correspond to the previously indicated ranges 0° to 17.4° and 382.6° to 400°) are to be cut away, and those portions in the ranges 10.7° to 235.7° (which, in the domain of the servomotor shaft, correspond to the previously indicated ranges 17.4° to 382.6°) are to be retained.

Figure 9A:
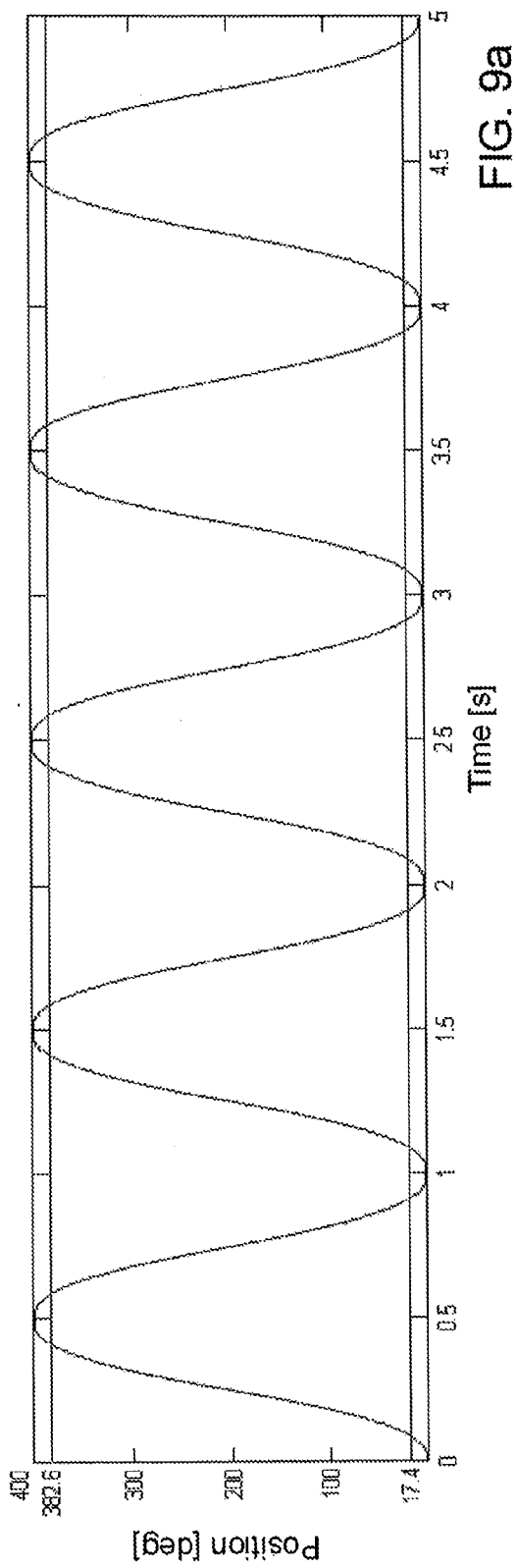
FIGS. 9a and 9b show relative positions of an inner ring with respect to an outer ring and, respectively, of a balls-cage assembly with respect to an inner ring of a rolling bearing plotted versus time.
Figure 9B:
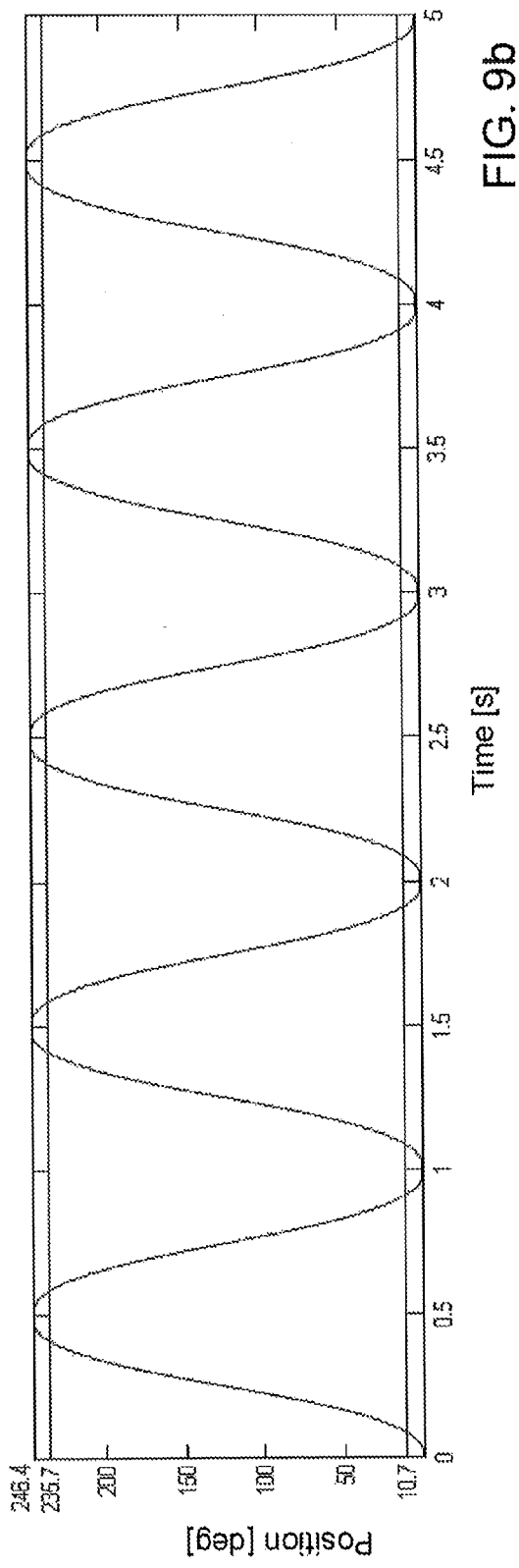

The aforementioned ranges are depicted in FIGS. 9a and 9b, where the positions of both the inner ring with respect to the outer ring (FIG. 9a) and the balls-cage assembly with respect to the inner ring (FIG. 9b) are plotted versus time.

In view of the foregoing, it may be appreciated that the angular gap between two adjacent rolling elements of the bearing depends on the type and geometry of the rolling bearing, and hence that the aforementioned signal processing depends, in addition to which bearing component is to be tested for faults (inner ring or outer ring), also on the geometrical parameters of the bearing.

In a second embodiment of the present invention, the time-sampled position signal x(t) and the filtered vibration signal $y_f(t)$ are processed such that they correspond to an integer number of complete rotations (360°) of the inner ring with respect to the outer ring, namely such that they look like as if they were generated by an inner ring that continuously rotates in the same direction, namely without any inversion of the rotation direction, with respect to the outer ring, and during which it performs an integer number of complete rotations with respect to the outer ring. Clearly, the higher the number of complete rotations, the richer the information based on which the vibration analysis will be performed.

Also in this second embodiment, this task is accomplished by carrying out a "cut & paste" operation on the time-sampled position signal x(t) and the filtered vibration signal $y_f(t)$ similar to that previously descried with reference to the first embodiment of the present invention.

Figure 10:
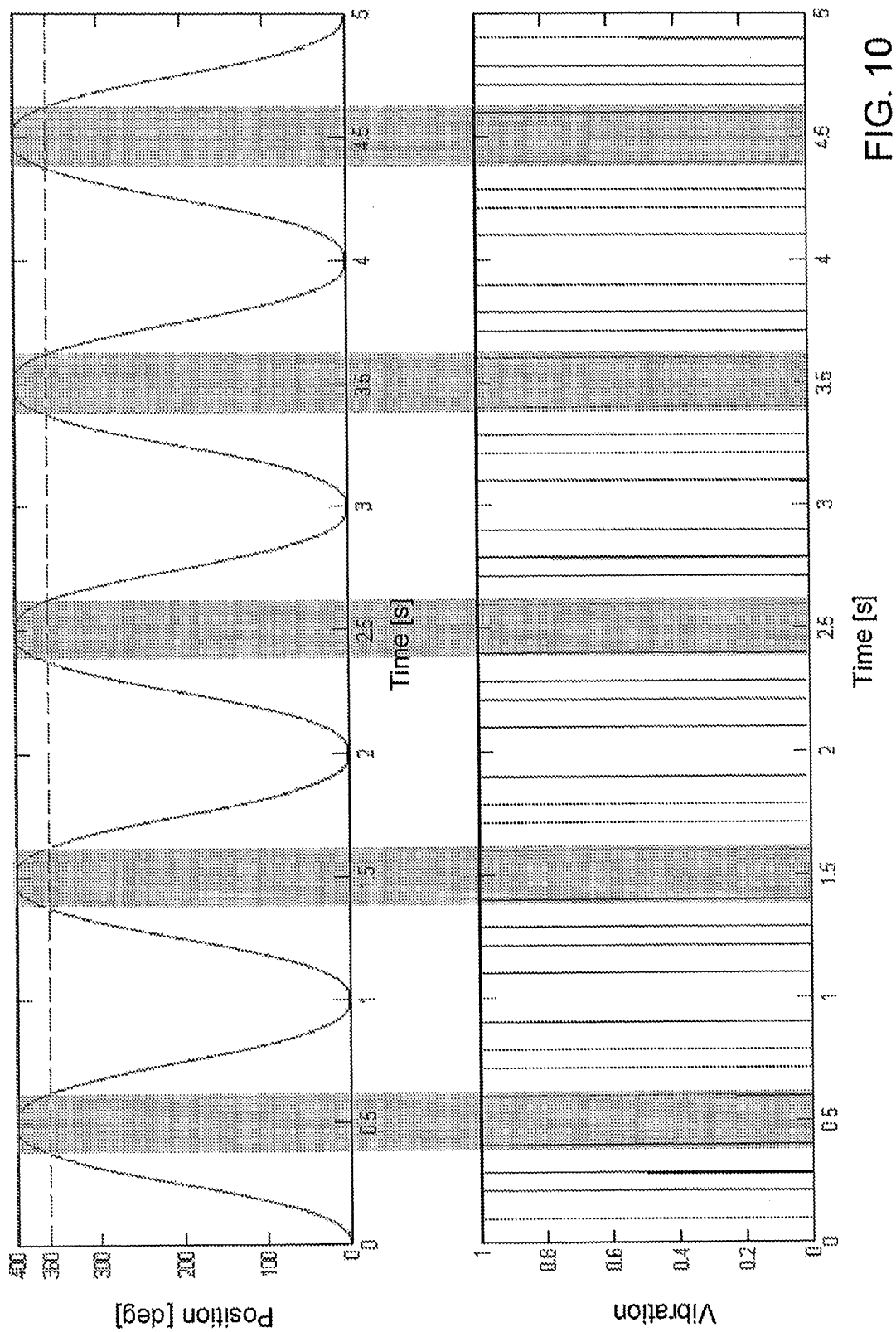
FIGS. 10 and 11 show a "cut & paste" operation according to a second embodiment of the present invention, to be performed on an acquired position signal x(t) and a filtered vibration signal $y_f(t)$.
Figure 11:
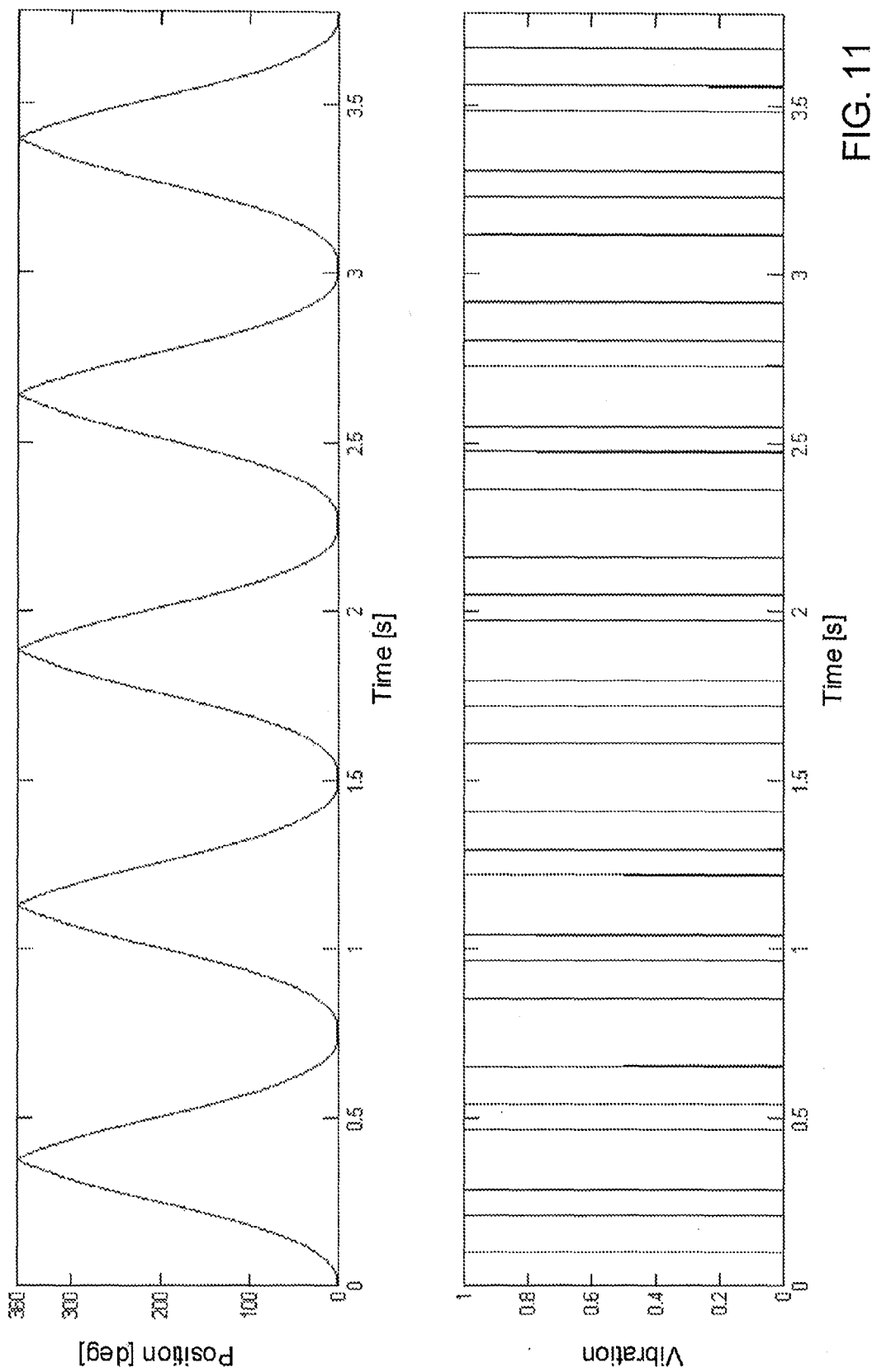

This operation is shown in FIGS. 10 and 11, which are similar to FIGS. 4 and 5, and wherein the portions of the time-sampled position signal x(t) and of the filtered vibration signal $y_f(t)$ that are to be cut away therefrom are those corresponding to the final portions of the original operating cycle, namely the portion exceeding 360°, i.e., in the ranges 360° to 400°.

The skilled person may appreciate that other portions of the time-sampled position signal x(t) and of the filtered vibration signal $y_f(t)$ than those shown in FIG. 10 may be cut away therefrom, which allow the same result to be achieved.

For example, there may be cut away those portions of the time-sampled position signal x(t) and of the filtered vibration signal $y_f(t)$ corresponding to the initial portions of the original operating cycles, namely the portions in the ranges 0° to 40°, or those portions of the time-sampled position signal x(t) and of the filtered vibration signal $y_f(t)$ corresponding to both the initial and final portions of the original operating cycles, conveniently in equal parts, for example those portions in the ranges 0° to 20° and 380° to 400°, so resulting in the retained portions of the time-sampled position signal x(t) and of the filtered vibration signal $y_f(t)$ being centered in the respective operating cycles.

It is worth noting that the "cut & paste" operation may be superfluous if the rotation of the bearing under test is monotonic and ramp-like, as long as there is a certain number of complete rotations in the time-sampled position signal x(t) and the filtered vibration signal $y_f(t)$, but becomes crucial in case of a cyclic motion. This operation is done with the help of the transmission coefficients in (2) and in practice outputs, as result, two vectors $\hat{y}, \hat{x} \in \mathcal{H}^n$.

In view of the foregoing, it may be appreciated that in order for the time-sampled position signal x(t) and the filtered time-sampled vibration signal $y_f(t)$ to be processed as described above, it is not necessary any more to know in advance which is the candidate bearing component to be tested for faults, and hence in this second embodiment this step may be omitted.

It is also worth noting that the two embodiments of the present invention have been described with reference to a servomotor application wherein the rolling bearing supports the servomotor shaft and hence the outer ring is fixed to a stationary part of the servomotor, while the inner ring is rotatably coupled to the servomotor shaft and hence rotates with respect to the outer ring at the same speed of the servomotor. Therefore, in the application considered the relative rotation of the inner ring with respect to the outer ring corresponds to the rotation of the servomotor shaft. However, it may be appreciated that what has been previously described with respect to the application considered may be applied generally to any other application wherein the inner and outer rings relatively rotates one with respect to the other, namely wherein the inner ring is fixed to a stationary member and the outer ring is rotatably coupled with a rotating member, and wherein both the inner and the outer rings are rotatably coupled to rotating members which rotate in the same or different directions.

The skilled person will also appreciate that the teaching of the present invention also apply to rolling bearings that are structurally different from, but operatively equivalent to the one previously described, in particulars to rolling bearings wherein the rolling bodies are retained and evenly angularly spaced apart by retaining means other than the cage described above, or rolling bearings without either an inner or an outer ring, namely wherein the rolling bodies directly rest on, and are radially retained by either an inner or, respectively, an outer rotating member, which, hence, plays the role of the corresponding missing ring.

With reference again to the flowchart shown in FIG. 2, the fourth step of the MCOT (block 400) is space sampling, in particular constant-space sampling, the processed position and vibration signals $\hat{x}(t)$ and $\hat{y}(t)$, such that they are respectively transformed to space-sampled position and vibration signals $\tilde{x}(t)$ and $\tilde{y}(t)$ under a non-linear re-sampling law, defined as a mapping F: $\mathcal{H}^n \times \mathcal{H}^n \times \mathcal{H} \to \mathcal{H}^n$, whose arguments are:

$$[\tilde{y}(\tau_1), \ldots, \tilde{y}(\tau_m)] = F[\hat{y}(t_1), \ldots, \hat{y}(t_n), \hat{x}(t_1), \ldots, \hat{x}(t_n), \Delta x] \qquad (6)$$

where $\Delta x$ represents the spatial sampling period, which is related to the minimum physical size of the fault that can be detected by the algorithm, and is in the order of magnitude of tenths or hundredths of degrees.

Expressed in pseudo-code, mapping F is:

```
ỹ(τ₁) := ŷ(t₁);
τ₁ := 0;
i := 2;
j := 2;
x_last := x(t₁);
while i ≤ n
    while |x̂(tᵢ) − x_last| < Δx
        i := i + 1;
    end
    x_curr := x_last + sgn(x̂(tᵢ) − x_last)Δx;
    τⱼ := τⱼ₋₁ + Δx;
    ỹ(τⱼ) := (ŷ(tᵢ) − ŷ(tᵢ₋₁))[ (x_curr − x̂(tᵢ))/(x̂(tᵢ) − x̂(tᵢ₋₁)) + 1 ] + ŷ(tᵢ₋₁);
    j := j + 1;
    x_last := x_curr;
end
``` which means, in simple terms, that the points in $\tilde{y}$ are separated by a variable time span, but a fixed rotation. If it is not possible to find a point in $\tilde{y}$ which corresponds to the desired rotation space, the algorithm interpolates linearly between the two closest values.

Figure 12A:
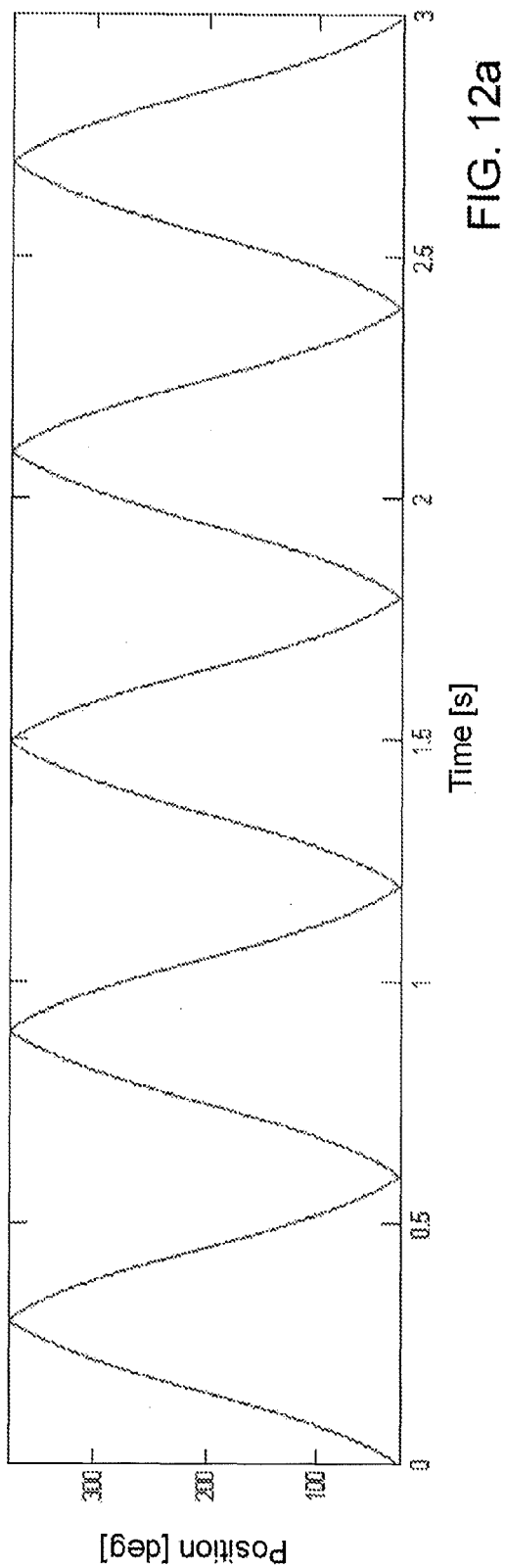
FIGS. 12a and 12b show a processed position signal $\hat{x}(t)$ obtained after a "cut & paste" operation and, respectively, a space-sampled position signal $\tilde{x}(t)$ obtained by constant-space sampling a processed position signal $\hat{x}(t)$.
Figure 12B:
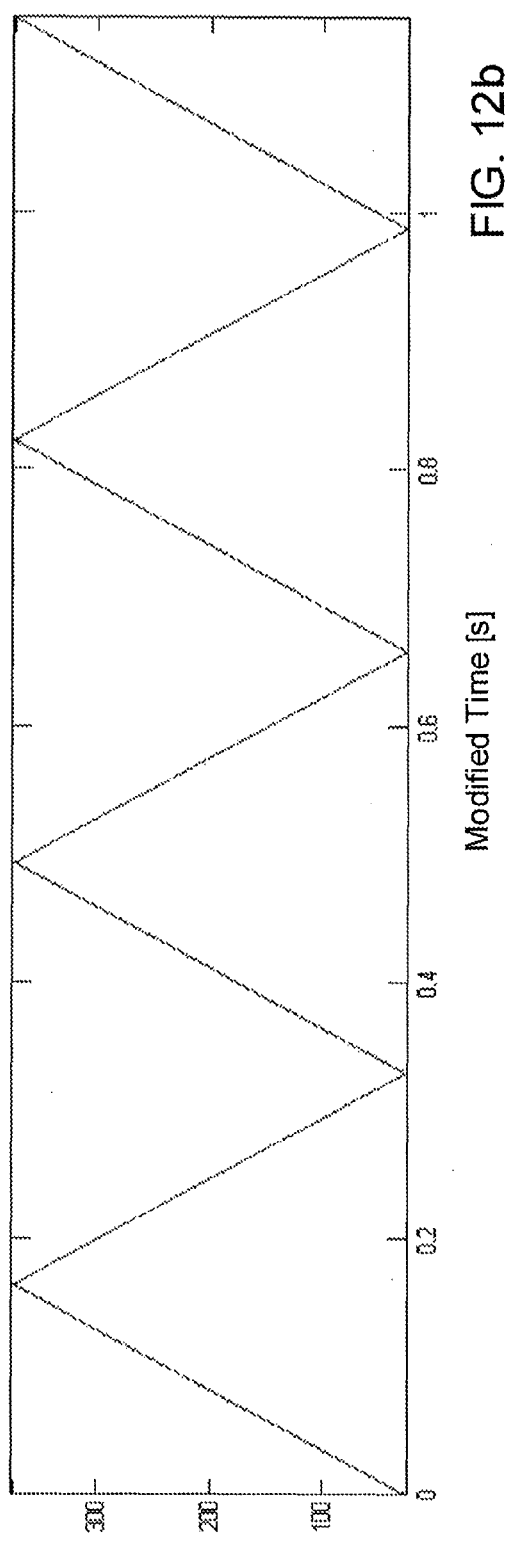

It is worth noting that, as shown in FIGS. 12a and 12b, as the processed position signal $\hat{x}(t)$ increases monotonically with time t (FIG. 12a), then the space-sampled position signal $\tilde{x}(t)$, when plotted vs. the modified time τ, is a sloped straight line that, when the motion is cyclically reversed, becomes a triangular wave with rising and falling ramps, whose slope is constant in modulus but different in sign (FIG. 12b).

Thanks to the mapping F, it is thus possible to generate a space-sampled vibration signal $\tilde{y}(t)$ where the frequency signature of a given typology of fault can be found (provided that the other previously mentioned assumptions hold). In particular, in order to identify the frequency signature in the space-sampled vibration signal $\tilde{y}(t)$, it is necessary to compute the damage frequency $f_d$ based on (1), which computation requires the preliminary computation of the rotation frequency $f_r$ of the servomotor shaft (or, alternatively, of the inner ring with respect to the outer ring). As the space-sampled position signal $\tilde{x}(t)$ is indicative of the shaft position "as seen" by the constant space sampling, the absolute value of the (constant) slope of the space-sampled position signal $\tilde{x}(t)$ is the rotation frequency $f_r$ sought, which also corresponds to the mean of the absolute value of the rotation speed in the acquisition period. However, as said before with reference to FIG. 12, when the rotation of the servomotor shaft, namely the rotation of the inner ring with respect to the outer ring, is cyclically reversed, the space-sampled position signal $\tilde{x}(t)$ has a triangular time development whose slope is constant in modulus but different in sign. Therefore, in order for the rotation frequency $f_r$ to be computed, it is necessary to cause the space-sampled position signal $\tilde{x}(t)$, and the space-sampled vibration signal $\tilde{y}(t)$ accordingly, to look like as if they were produced by a continuous rotation of the inner ring with respect to the outer ring in one and the same direction, i.e., without any inversion of the rotation direction, and at a constant speed throughout the acquisition period, so ensuring a constant sign of the rotation frequency $f_r$ over the entire acquisition period.

Therefore, the fifth step of the MCOT (block 500) is reversing, i.e., overturning (turning upside down), those portions of the space-sampled position and vibration signals $\tilde{x}(t)$ and $\tilde{y}(t)$ corresponding to either of the two groups of rising and falling ramps in the space-sampled position signal $\tilde{x}(t)$. In this way, the profile of the space-sampled position signal $\tilde{x}(t)$ changes from a triangular one to a saw-toothed one, whose slope is constant both in modulus and in sign over the entire acquisition period, so ensuring a rotation frequency $f_r$ with a constant sign over the entire acquisition period. This reversal ("flipping over") operation results in the reversed position and vibration signals shown in FIGS. 13 and 14, wherein the former relates to the first embodiment of the present invention and hence depicts the space-sampled position and vibration signals $\tilde{x}(t)$ and $\tilde{y}(t)$ obtained by space-sampling the processed position and vibration signals $\hat{x}(t)$ and $\hat{y}(t)$ shown in FIG. 5, while the latter relates to the second embodiment of the present invention and hence depicts the space-sampled position and vibration signals $\tilde{x}(t)$ and $\tilde{y}(t)$ obtained by space-sampling the processed position and vibration signals $\hat{x}(t)$ and $\hat{y}(t)$ shown in FIG. 8, and wherein the portions of the space-sampled position and vibration signals $\tilde{x}(t)$ and $\tilde{y}(t)$ that have been flipped over are those corresponding to the falling ramps of the space-sampled position signal $\tilde{x}(t)$.

It is worth stressing that the "flipping over" operation is necessary only when the servomotor shaft, and hence the associated rolling bearing, is operated so as to cyclically reverse its rotation direction, while it is not necessary at all when the servomotor shaft, and hence the associated rolling bearing, is operated cyclically without reversing its rotation direction.

It is also worth noting that for cyclic motions the fact that (1) holds also depends on the cutting operation before re-sampling, as this guarantees that for each cycle an integer number of impacts on the potentially damaged component are present.

In the end, the sixth and last step of the MCOT (block 600) is computing the rotation frequency $f_r$ and then the damage frequency $f_d$ based on the reversed position signal, computing the frequency spectrum of the reversed vibration signal by Fast Fourier Transforming the latter, and then by searching for peaks in the frequency spectrum of the reversed vibration signal that are separated in frequency by an amount equal to the damage frequency $f_d$, as in the classical vibration analysis.

Figure 15:
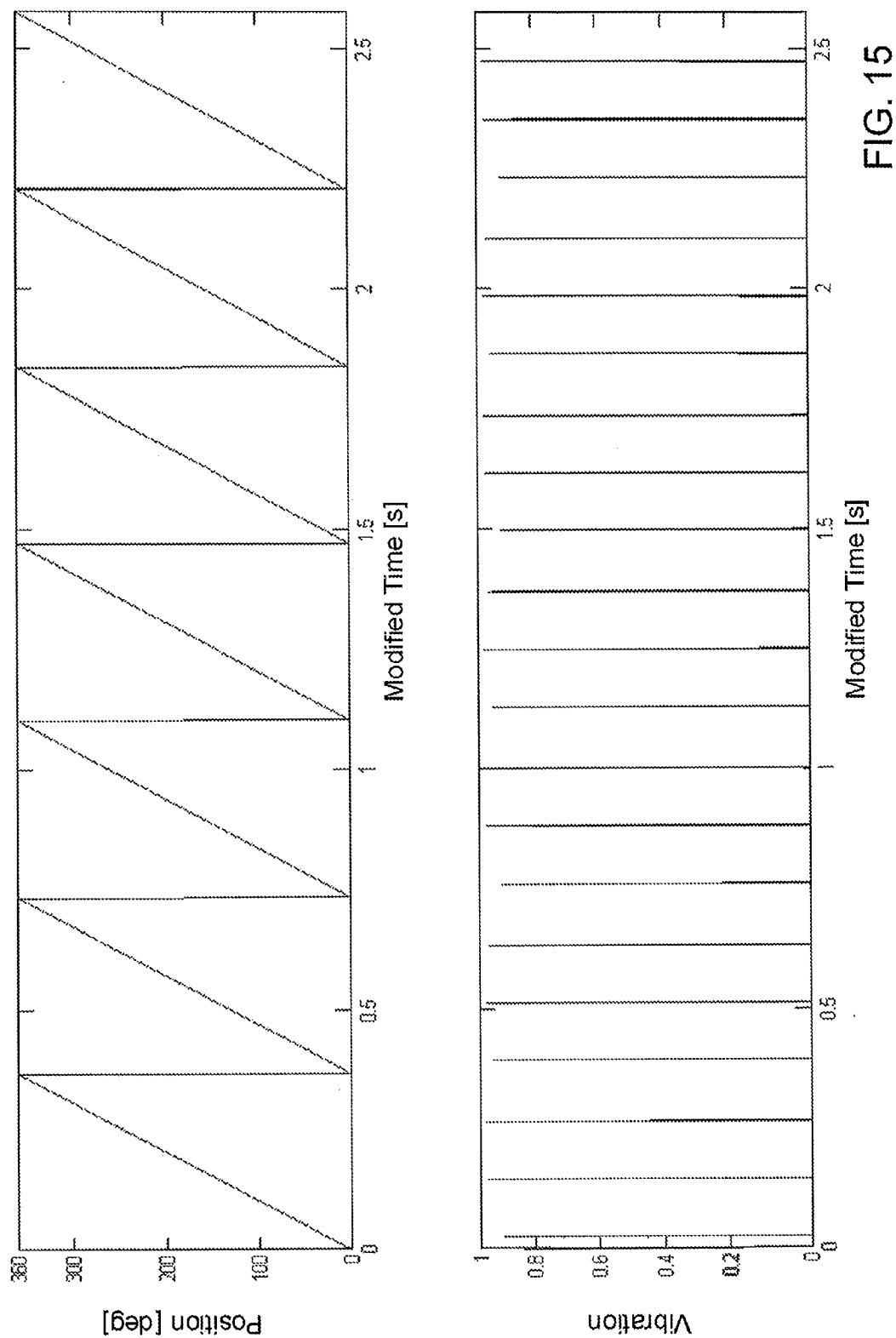
Figure 16:
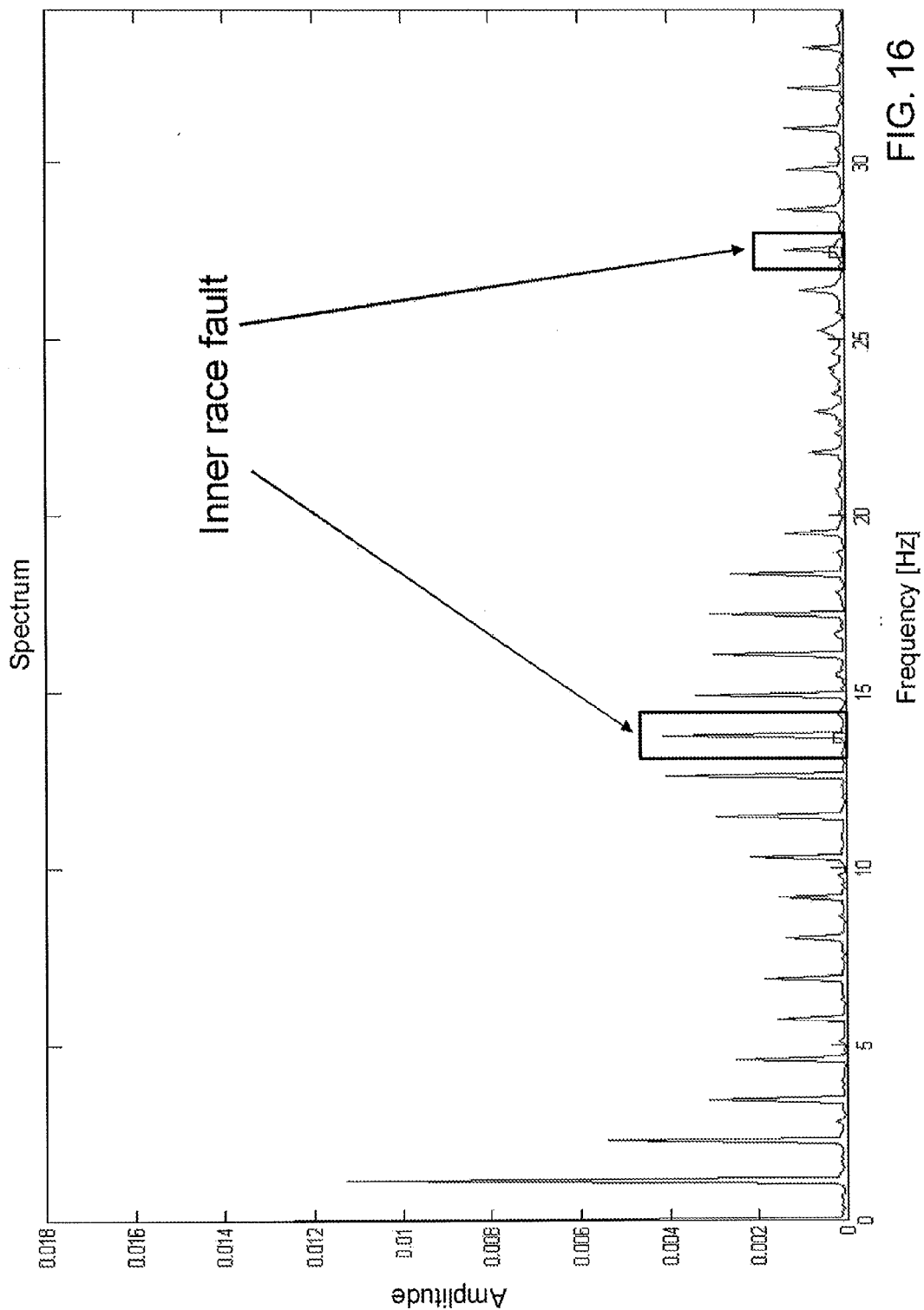
FIGS. 16 and 17 show frequency spectra of the reversed vibration signal shown in FIG. 13, wherein the damage frequencies relating to an outer ring fault and an inner ring fault are depicted.
Figure 17:
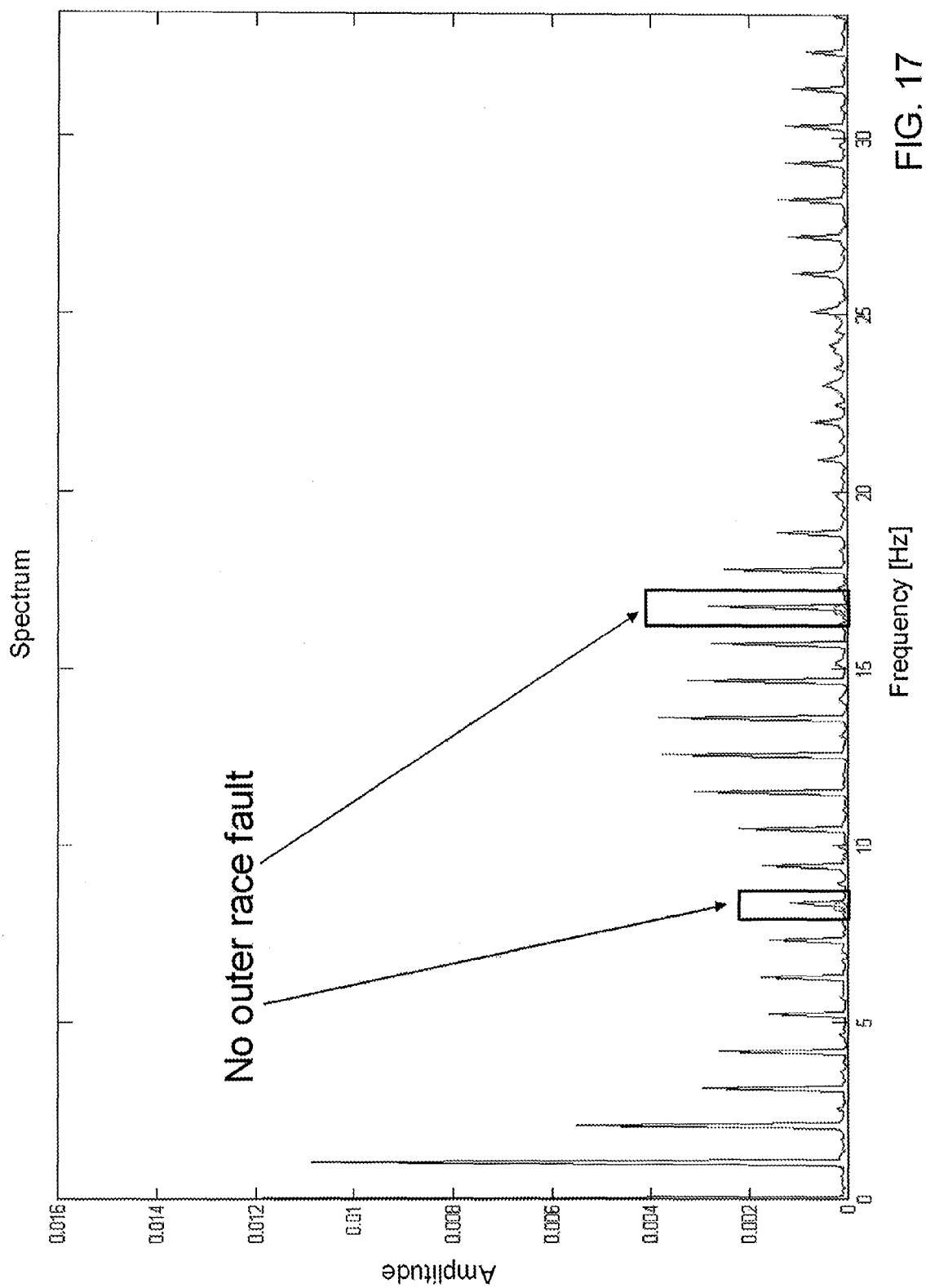

FIGS. 15 and 16 show two frequency spectra of a reversed vibration signal obtained by implementing twice the MCOT according to the first embodiment of the present invention to test a rolling bearing for a fault in the inner ring and, respectively, in the outer ring. In particular, the frequency signature (damage frequency $f_d$ and the corresponding first higher harmonic thereof) relating to an inner ring fault is depicted by squares in FIG. 15, while the frequency signature relating to an outer ring fault is depicted by circles in FIG. 16. As may be appreciated, in FIG. 15 the damage frequency relating to an inner ring fault is at a value where the envelope of the frequency spectrum has a relative maximum, so being indicative of a fault in the inner ring, while in FIG. 16 the damage frequency relating to an outer ring fault is present at a value where the envelope of the frequency spectrum has a relative minimum, so being indicative of no fault in the outer ring.

The invention claimed is:

1. A method of predicting a fault in a rolling bearing, the rolling bearing including inner and outer rings and rolling bodies evenly angularly distributed therebetween, the method comprising:
    processing a position signal indicative of a relative angular position of the inner ring with respect to the outer ring, and a vibration signal indicative of speed-related vibrations in the rolling bearing, such that they correspond to either an angular displacement of the rolling bodies equal to an integer number of angular gaps between adjacent rolling bodies or an integer number of complete rotations of the inner ring with respect to the outer ring, the processing being performed by a digital signal processor;
    space sampling the processed vibration signal based on the processed position signal;
    predicting a fault in the rolling bearing based on the space-sampled vibration signal;
    wherein the rolling bearing is operated to cyclically reverse relative rotation direction of the inner ring with respect to the outer ring, and during the cyclical reversal of the relative rotation direction of the inner ring with respect to the outer ring, the processing of the position and vibration signals includes:
    processing the position and vibration signals such that they correspond, in each operating cycle, to either an angular displacement of the rolling bodies equal to an integer number of angular gaps between adjacent rolling bodies or an integer number of complete rotations of the inner ring with respect to the outer ring; and
    processing the space-sampled vibration signal obtained during the cyclically reversed relative rotation direction of the inner ring with respect to the outer ring such that it corresponds to a continuous rotation of the inner ring with respect to the outer ring in one and the same direction and at a constant speed.

2. The method of claim 1, wherein the processing of the position and vibration signals occurs at least during a cyclical reversal of the relative rotation direction of the inner ring with respect to the outer ring.

3. The method of claim 1, wherein, when the rolling bearing is operated cyclically without reversing a relative rotation direction of the inner ring with respect to the outer ring, the processing of the position and vibration signals includes:
   processing the position and vibration signals such that they correspond, in each operating cycle, to either an angular displacement of the rolling bodies equal to an integer number of angular gaps between adjacent rolling bodies or an integer number of complete rotations of the inner ring with respect to the outer ring.

4. The method of claim 1, wherein the processing of the space-sampled vibration signal includes:
   space sampling the processed position signal, whereby generating a space-sampled position signal having a substantially triangular time development with rising and falling ramps; and
   reversing those portions of the space-sampled vibration signal that correspond to either the rising or the falling ramps in the space-sampled position signal.

5. The method of claim 1, wherein the processing of the position and vibration signals further includes:
   computing a relative angular displacement of the rolling bodies with respect to a selected one of the inner and outer rings, such that it is equal to an integer number of angular gaps between adjacent rolling bodies, based on the position signal; and
   processing the vibration signals based on the computed relative angular displacement of the rolling bodies.

6. The method of claim 1, wherein the space sampling includes:
   constant-space sampling.

7. The method of claim 1, wherein the predicting of the fault in the rolling bearing includes:
   Fast Fourier Transforming the space-sampled vibration signal, whereby generating a frequency spectrum of the space-sampled vibration signal; and
   searching for a frequency signature characteristic of the fault.

8. The method of claim 1, further including:
   selecting one of the inner and outer rings; and
   carrying out the method of any one of the preceding claims to test the rolling bearing for a fault in the selected ring.

9. The method of claim 1, wherein the processing of the position and vibration signals includes:
   time sampling the position and vibration signals.

10. The method of claim 1, wherein the processing of the position and vibration signals includes:
    band-pass filtering and carry out an envelope analysis on the vibration signal.

* * * * *